(12) United States Patent
Dixon et al.

(10) Patent No.: US 11,108,788 B1
(45) Date of Patent: Aug. 31, 2021

(54) TECHNIQUES FOR MANAGING PROJECTS AND MONITORING NETWORK-BASED ASSETS

(71) Applicant: RiskIQ, Inc., San Francisco, CA (US)

(72) Inventors: Brandon Dixon, San Francisco, CA (US); Jonas Edgeworth, San Francisco, CA (US); Stephen Ginty, Memphis, TN (US); Chris Kiernan, San Francisco, CA (US); Elias Manousos, San Francisco, CA (US); Jonathan Matkowsky, Mercer Island, WA (US)

(73) Assignee: RiskIQ, Inc., San Francisco, CA (US)

( * ) Notice: Subject to any disclaimer, the term of this patent is extended or adjusted under 35 U.S.C. 154(b) by 246 days.

(21) Appl. No.: 15/980,695

(22) Filed: May 15, 2018

Related U.S. Application Data

(60) Provisional application No. 62/506,581, filed on May 15, 2017.

(51) Int. Cl.
*H04L 29/06* (2006.01)
*G06T 11/20* (2006.01)
*G06F 3/0484* (2013.01)

(52) U.S. Cl.
CPC ...... *H04L 63/1416* (2013.01); *H04L 63/1425* (2013.01); *G06F 3/04847* (2013.01); *G06T 11/206* (2013.01); *G06T 2200/24* (2013.01)

(58) Field of Classification Search
USPC .................................................. 726/23
See application file for complete search history.

(56) References Cited

U.S. PATENT DOCUMENTS

| | | | |
|---|---|---|---|
| 8,655,989 B2* | 2/2014 | Ritter | G06Q 10/06 709/220 |
| 9,516,052 B1* | 12/2016 | Chauhan | H04L 43/026 |
| 10,732,810 B1* | 8/2020 | Cohen | G06F 16/901 |
| 2010/0275263 A1* | 10/2010 | Bennett | G06F 21/577 726/25 |
| 2011/0030058 A1* | 2/2011 | Ben-Itzhak | H04L 63/166 726/24 |
| 2011/0247073 A1* | 10/2011 | Surasathian | H04L 63/0227 726/24 |

(Continued)

OTHER PUBLICATIONS

In-network, push-based network resource monitoring: scalable, responsive network management Taylor Groves, Dorian Arnold, Yihua He NDM '13: Proceedings of the Third International Workshop on Network-Aware Data Management . Nov. 2013, Article No. 8, pp. 1-6 (Year: 2013).*

(Continued)

*Primary Examiner* — Samson B Lemma
*Assistant Examiner* — Mohammad S Shams
(74) *Attorney, Agent, or Firm* — Wong & Rees LLP

(57) ABSTRACT

Techniques are disclosed of enabling projects to be managed for grouping artifacts about related network activity. A graphical interface can be provided to enable users to create both public and private projects with information including names, descriptions, collaborators and monitoring profiles. A project can include context and history of the project so multiple users can collaborate within a project to view the analysis process as assets are identified in the project. Information is retrieved for identified assets in separate projects and is available for display in the graphical interface.

21 Claims, 30 Drawing Sheets

(56) References Cited

U.S. PATENT DOCUMENTS

| | | | | |
|---|---|---|---|---|
| 2012/0233668 A1* | 9/2012 | Leafe | ................... | G06F 9/00 |
| | | | | 726/4 |
| 2013/0304903 A1* | 11/2013 | Mick | ................... | H04L 67/10 |
| | | | | 709/224 |
| 2014/0059226 A1* | 2/2014 | Messerli | ................... | H04L 47/783 |
| | | | | 709/226 |
| 2014/0165133 A1* | 6/2014 | Foley | ................... | H04L 63/14 |
| | | | | 726/1 |
| 2014/0282889 A1* | 9/2014 | Ishaya | ................... | H04L 63/0876 |
| | | | | 726/4 |
| 2016/0072815 A1* | 3/2016 | Rieke | ................... | H04L 63/1433 |
| | | | | 726/3 |
| 2016/0180557 A1* | 6/2016 | Yousaf | ................... | G06F 16/334 |
| | | | | 715/762 |
| 2016/0246495 A1* | 8/2016 | Neels | ................... | G06F 3/04847 |
| 2016/0359740 A1* | 12/2016 | Parandehgheibi | .... | G06F 16/248 |
| 2017/0147681 A1* | 5/2017 | Tankersley | ................... | G06F 11/3006 |
| 2017/0201425 A1* | 7/2017 | Marinelli | ................... | H04L 49/40 |
| 2017/0230409 A1* | 8/2017 | Ahmed | ................... | H04L 63/1416 |
| 2017/0310702 A1* | 10/2017 | Chantz | ................... | H04L 63/1425 |
| 2017/0318035 A1* | 11/2017 | Baughman | ................... | G06N 3/08 |
| 2018/0060149 A1* | 3/2018 | Flyax | ................... | G06F 11/0769 |
| 2018/0089188 A1* | 3/2018 | Kharisma | ................... | G06F 16/2255 |
| 2018/0109538 A1* | 4/2018 | Kumar | ................... | H04L 63/10 |
| 2018/0113640 A1* | 4/2018 | Fernandez | ................... | G06F 3/061 |

OTHER PUBLICATIONS

Fast payload-based flow estimation for traffic monitoring and network security Fang Hao, Murali Kodialam, T.V. Lakshman, Hui Zhang ANCS '05: Proceedings of the 2005 ACM symposium on Architecture for networking and communications systems . Oct. 2005, pp. 211-220 (Year: 2005).*

An Asset to Security Modeling?: Analyzing Stakeholder Collaborations Instead of Threats to Assets Andreas Poller, Sven Turpe, Katharina Kinder-Kurlanda NSPW '14: Proceedings of the 2014 New Security Paradigms Workshop . Sep. 2014, pp. 69-82 (Year: 2014).*

* cited by examiner

FIG. 4

TEAM PROJECTS  +New Project  Browse Public Projects

FACETS ⊕

| | Name | Status | Monitor Profile | Recent Alerts | Owner | Tags |
|---|---|---|---|---|---|---|
| ☐ | ⊛ Default | Active | anonymous | Coming Soon! | brandon@passivetotal.org | |
| ☐ | ⊛ dqwd | Active | demo | Coming Soon! | brandon@passivetotal.org | |
| ☐ | ⊛ RiskIQ Assets | Active | demo | Coming Soon! | brandon@passivetotal.org | ⬥defense ⬥sec |

1-3 of 3

STATUS
No results

TAGS (2/2)
✓ × defense  1
✓ × security  1

OWNER (1/3)
✓ × brando... 3

MONITOR (2/3)
✓ × demo   2
✓ × anony... 1

TOURS
Coming Soon!

TOP 10 PUBLIC PROJECTS
⬥ dqwd
⬥ dwqd
⬥ Manhatten
⬥ Project P
⬥ Random Bad Stuff
⬥ test
⬥ test1
⬥ test2

Tracking and viewing all RiskIQ assets into one common place.

Artifacts (7)   Alerts (0)   Project History 1-7 of 7   Sort: Artifact Ascending ▾

| Artifact | Type | Created | Creator | Context |
|---|---|---|---|---|
| 104.239.227.87 | IP | 10-13-2016, 11:30:50 pm | brandon@passivetotal.org | pdns: www.riskiq.com added |
| 52.9.20.68 | IP | 10-17-2016, 12:42:48 am | brandon@passivetotal.org | pdns: passivetotal.org added |
| 98.125.38.107 | IP | 10-15-2016, 3:35:47 am | brandon@passivetotal.org | pdns: www.voemovosti.com a |
| arms-expo.net | Domain | 10-15-2016, 3:36:41 am | brandon@passivetotal.org | pdns: arms-expo.net added fr |
| kdsmaybfxw.riskiq.net | Domain | 10-14-2016, 6:42:48 pm | brandon@passivetotal.org | pdns: 162.209.8.240 added fr |
| www.riskiq.com | Domain | 10-13-2016, 7:47:33 pm | brandon@passivetotal.org | direct: www.riskiq.com added |
| www.riskiq.net | Domain | 10-13-2016, 7:47:33 pm | brandon@passivetotal.org | direct: www.riskiq.net added f |

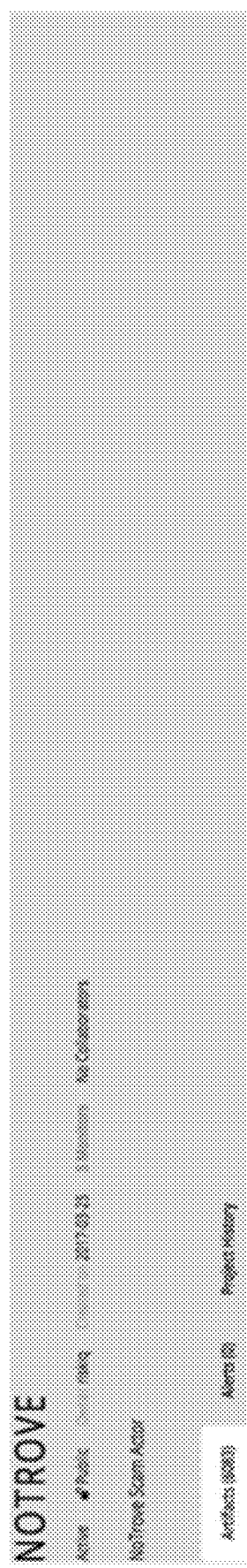
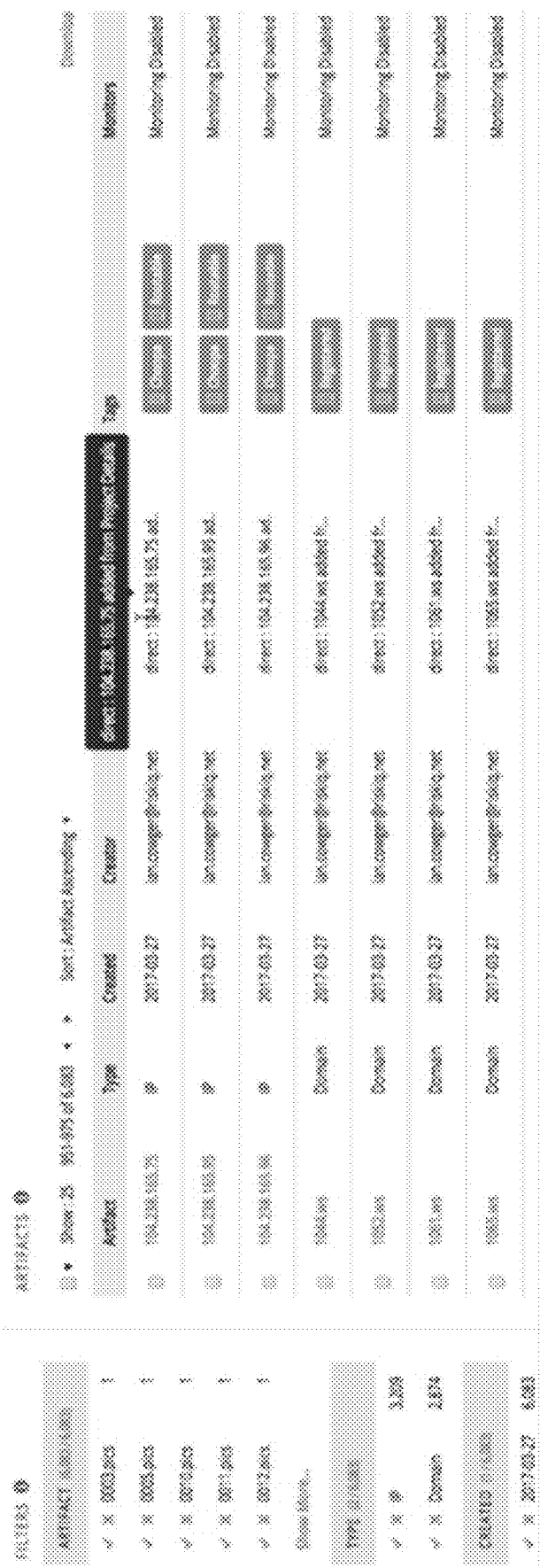
FIG. 21

TECHNIQUES FOR MANAGING PROJECTS AND MONITORING NETWORK-BASED ASSETS

PRIORITY CLAIM

This application claims benefit under 35 U.S.C. § 119(e) of Provisional Application No. 62/506,581, filed May 15, 2017, the entire contents of which is hereby incorporated by reference as if fully set forth herein.

TECHNICAL FIELD

Embodiments relate generally to threat detection, and, more specifically, to techniques for managing projects and monitoring network-based assets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. People (e.g., a network analyst) involved in performing infrastructure analysis of Internet-based activity may gather information from many different disparate data sources to identify network threats or changes in network infrastructure, which may relate to malicious network activity. The data sources may include provide data about domain name system (DNS) activity, WHOIS records, secure socket layer (SSL) certificates, and other page-content attributes. The data sources may be managed by different providers and may store different types of information. The information may have different formats and may vary for different time periods.

To analyze the data to identify changes in network infrastructure, an analyst may have to query many different data sources individually and gather relevant information manually. In some instances, a significant amount of time may be incurred to load each individual resource that provides data, execute a query, and receive the results of the query. An analyst may be faced with assessing the data (e.g., artifacts in the data) to determine trends in network activity over a given time period for a domain or an IP address. In some instances, analysts may not be able to easily identify a pattern of network activity for significant periods of time without generating additional data or visualizing the data. The format or the structure of the data may limit an analyst to identify correlations or relationships between artifacts. Managing artifacts about network-based assets becomes a challenge for an investigation of network activity. Assessing network activity is difficult without a way to visualize the artifacts about assets and any relationship between artifacts and/or assets.

Often time, analysts within the same organization may be investigating the same network threat without knowing it. One analyst may have discovered a trend with certain artifacts, while the other analyst may have not. The data analyzed for the artifacts may be not be the same between any given investigation. Users may be challenged with ways to collaborate the artifacts of their investigations, which may be related in some way. Specifically, users are unable to connect artifacts for an network-based asset to different investigations, which may involve different or overlapping periods of time. The number of artifacts and assets may be far too great for users to monitor for changes. Network activity that poses a threat to an asset may result in the creation of new or different artifacts that may be difficult to identify and correlate to existing assets that are being analyzed.

BRIEF DESCRIPTION OF THE DRAWINGS

Illustrative embodiments of the present disclosure are described in detail below with reference to the following drawing figures:

FIGS. 4-29 illustrates graphical interfaces for a network analysis system according to some embodiments.

DETAILED DESCRIPTION

Figure 1:
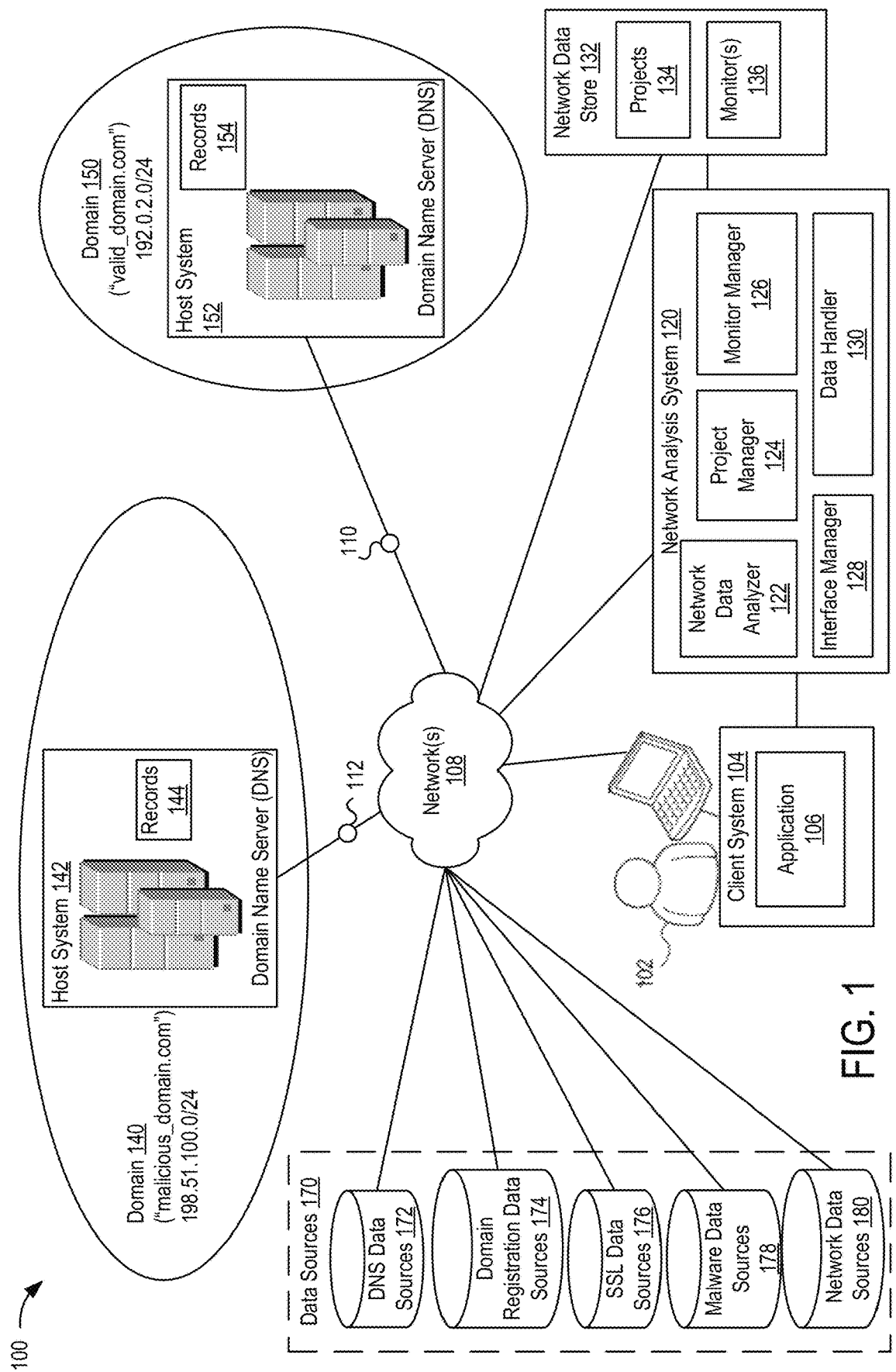
FIG. 1 shows a high-level block diagram illustrating a network analysis system according to an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in memory (e.g., on a memory device, on a non-transitory computer-readable storage medium). In some embodiments, the processes depicted in sequence diagrams and flowcharts herein can be implemented by any of the systems disclosed herein. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple substeps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs). Embodiments of the present disclosure are directed to techniques for infrastructure analysis of Internet-based activity. Some embodiments solve these and other challenges individually and collectively. Specifically, embodiments of the present disclosure enable data (e.g., artifacts) about network assets to be managed in groups (e.g., projects) for network analysis of assets. The logical groups may be merged and/or related to one another to connect related assets and identify network activity related to a threat investigation. Techniques include providing a graphical interface to manage projects and to monitor network assets with respect to artifacts about those assets.

One of the primary byproducts from network infrastructure analysis is almost always a set of indicators (e.g., artifacts) that tie back to a threat actor or group of actors. These indicators serve as a way of identifying campaigns later on and provide insight into how the threat actors operate. Users have desired a way to group similar network activity while retaining context of those activities for investigation of possible threats. Techniques disclosed enable an artifact in separate projects to be combined in one of those projects. The artifact can include combining the underlying network activity thereby enabling a richer analysis of network activity of the artifacts in a project. A project can enable a user to interact with an artifact to view the network data for that artifact and/or to identify other related projects. A project can include context and history of the project so multiple users can collaborate within a project to view the analysis process as assets are identified in the project. In some embodiments, a project may be defined by one or more attributes, which define the constraints for network assets to be managed in a project.

Techniques are disclosed of enabling projects to be managed for grouping artifacts about related network activity. A graphical interface can be provided to enable users to create both public and private projects with information including names, descriptions, collaborators and monitoring profiles. When pivoting inside of a network analysis tool, users can now hover over indicators of interest and automatically add them to a project. This process not only keeps track of the indicator, who added it, and when, but also notes where it was added from. For example, if a person searched for "riskiq.com," the person may view a WHOIS record to see that the domain was registered by "domains @riskiq.com." Adding that email address to a project would tell the person that "riskiq.com" was used as the query when the addition was made. Visiting a project's details shows a listing of all associated artifacts and a detailed history that retains all the context described above. Users within the same organization no longer need to spend time communicating back and forth. Threat actor profiles can be built on the basis of indicators that are "living" within a project. As new information is discovered or found, it can be added to that project.

One of the challenges with conducting analysis of network activity is identifying changes in network assets. It may be difficult to identify changes in artifacts which may not be discoverable unless monitored as a group or in relation to other artifacts. Techniques disclosed herein enable monitoring of assets by providing interactive features for defining monitoring for any asset. Graphical interfaces are disclosed for enabling a user to provide input to select assets for monitoring with regard to changes in any of their artifacts. In some embodiments, one or more rules may be configured for monitoring, such that assets identified based on such rules will be monitored according to those rules. A graphical interface may be presented to indicate a visual appearance for a notification based on monitoring an asset. One or more communications (e.g., an email or a message) may be distributed to users to indicate a change in infrastructure for an asset. The techniques described above improves the performance of the network analytic system in making it easier to identify potential threat actors. In some embodiments, a candidate set of potential threat actors and/or assets associated with the potential threat actors may be automatically created using the techniques used herein. Thus, the system is enhanced and performance of network analytic system is greatly improved.

I. High-Level View of Network Analysis System

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analysis system 120. Network analysis system 120 may be implemented by a computing system. Client system 104 may be operated by one or more users (e.g., user 102), such as an analyst, whose role it is to assess network activity including Internet activity. Network analysis system 120 enables a user of a client to perform analysis of infrastructures of network-based digital assets (also referred to herein as "assets," "network assets," or "digital assets"). Such assets may be owned or associated with an entity (e.g., a company or network domain). Examples of network-based digital assets include, without restriction, domain names, hosts, domain name system (DNS) records, Internet protocol (IP) addresses, IP address blocks, mail servers, secure sockets layer (SSL) certificates, web servers, web pages, cookies, and particular files (e.g., advertisements, videos, etc.). The analysis may be used to determine Internet activity based on network data. The processing performed by network analysis system 120 may result in the discovery of information, or "artifacts," about network assets. An artifact may include information identifying the network asset. Although the techniques disclosed herein for project and monitoring may be described with reference to an artifact or an asset, the techniques are applicable for either of artifacts or assets.

Network data may include data about hosts, data about domain names, data about DNS records (e.g., passive DNS data and active DNS data), secure socket layer (SSL) data, malware data, domain registration data (e.g., WHOIS records), data about Border Gateway Protocol (BGP), other data than can be generated based on data in this disclosure, or a combination thereof. The data about DNS records may be obtained from an implementation of a DNS system. Data about DNS records may include DNS data (e.g., passive DNS data and active DNS data). DNS data may be obtained from one or more servers implemented for a DNS. Network data may include data related to or involving protocols (e.g., communication protocols) such as an Internet protocol. Such data may include DNS data or data for a DNS. Examples of protocols may include, without limitation, Hypertext Transfer Protocol (HTTP), HTTP secure (HTTPS), file transfer protocol (FTP), file transfer protocol secure (FTPS), secure copy protocol (SCP), secure shell (SSH) file transfer protocol (SFTP), trivial FTP (TFTP), lightweight directory access protocol (LDAP), directory access protocol (DAP), dictionary network protocol (DICT), TELNET protocol, FILE protocol, Internet message access protocol (IMAP), post office protocol 3 (POP3), simple mail transfer protocol (SMTP), and rapid spanning tree protocol (RTSP). Network data may include data related to communications involving one or more network protocols. The communication may be related to accessing data over a communication network.

Client system 104 may include an interface, such as a physical interface, a graphical interface (e.g., a graphical user interface), or a combination thereof. A graphical interface may be generated by client system 104, received from network analysis system 120, or a combination thereof. The graphical interface may be updated, modified, enhanced, and regenerated, without restriction, by client system 104 and/or network analysis system 120 in response to one or more events (e.g., an interaction with the graphical interface). Examples of graphical interfaces are disclosed herein with reference to the figures. The graphical interface(s) enable functionality of network analysis system 120. A graphical interface may be provided by network analysis system 120 via network 108 as part of a service (e.g., a cloud service) or application. Examples of graphical interfaces for implementing techniques in this disclosure include U.S. patent application Ser. No. 15/398,295, filed Jan. 4, 2017, entitled "Techniques for Infrastructure Analysis of Internet-Based Activity," by Dixon et al., the entire contents of which are hereby incorporated by reference for all purposes as if fully set forth herein as well as FIGS. 4-29. In some embodiments, client system 104 may provide access to one or more applications 106 ("app"). App 106 may enable a user to access and perform services provided by network analysis system 120.

Client system 104 and network analysis system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analysis system 120 may be included in or implemented in a RiskIQ™ product or service, such as PassiveTotal™. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include network data analyzer 122, project manager 124, monitor manager 126, interface manager 128, and data handler 130. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analysis system 120 may also provide other services or software applications can include non-virtual and virtual environments. In some embodiments, these services may be offered as web-based or cloud services or under Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources, such as DNS data sources 172, domain registration data sources 174 (e.g., WHOIS registration sources), SSL data sources 176, malware data sources 178, and network data sources 180 (e.g., communication records). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analysis system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as network data store 132. Network data store 132 may store data for implementing projects 134 and/or data for implementing monitoring 136. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 132 may be accessible by network analysis system 120 using network 108.

System 100 may include one or more network domains (e.g., an Internet domain name), such as domain 140 and domain 150. Each domain may be implemented by a host system, which implements a domain name system (DNS) server for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped DNS) to one or more IP addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). As used herein, a host may include general purpose computers, as well as other devices, that have an IP address.

System 100 may implement one or more techniques for network data capture. System 100 may include a data capture system 110, 112 to capture network data communicated via network 108. Data capture system may capture network data actively and/or passively. Active network data may include Active DNS data obtained from monitoring by requesting data about a subset of network assets, e.g., Internet domain names and/or resolution of IP addresses. Network data may include passive DNS data collected from DNS records and/or data gathered by sensors on networks. In other words, passive DNS data may be data that is gathered "passively" by monitoring activity on a network. The sensors may be setup to capture DNS data, such as data about DNS requests and responses occurring on those networks. Passive DNS data may be useful to determine changes to an Internet domain or resolution of an IP address over time.

Data capture system 110, 112 may be implemented by or as a part of network analysis system 120. Data capture system 110 may be implemented using hardware (e.g., network device), software, firmware, or combinations thereof. Data capture system 110, 112 may passively capture network data by monitoring data as it passes by. The network data may include requests and responses in communications for accessing domain 140 and/or domain 150. Data capture system 110, 112 may be part of or communicatively coupled to network analysis system 120. In at least one embodiment, client system 104 may include an agent ("capture agent") that can capture data communicated in system 100. The agent may be an application that resides on client system 104. The agent may be part of data capture system 110, 112. Data captured by data capture system 110, 112 and/or by the agent may be communicated to network analysis system 120 and/or directly stored in network data store 132. In some embodiments, the data captured may be stored in one or more of data sources 170. In some embodiments, data capture system 110, 112 may actively capture data by querying and retrieving data from one or more data sources 170.

Network analysis system 120 may aggregate network data using passive and/or active data aggregation techniques. Without network analysis system 120, a user such as a network analyst would have to query a myriad of different sources per data type. Network analysis system 120 reduces if not eliminates the amount of time to load each individual data source (e.g., a website), execute a query and then wait for results. Even once results have been loaded, the user would still need to aggregate them all together. For example, a user interested in aggregating data from multiple data sources 170 may have to implement several processes, including querying web interfaces available to get information from several sources, writing code to query all source APIs (assuming the source has one) to get information, use a combination of web or API queries to collect data. The user would have to communicate with host systems 142, 152 to obtain data about network activity. For example, data handler 130 may perform operations to aggregate network data.

In some embodiments, monitor manager 126 of network analysis system 120 may monitor data to detect an occurrence of an event for which an asset is to be monitored. Network activity by one or more assets may be monitored according to one or more rules. The rules may be defined based on one or more attributes specified by a user through a graphical interface disclosed herein. Although monitoring is described with respect to a single asset or artifact, monitoring may be implemented for multiple assets or artifacts. Attributes may include keywords or other information such as a type of event to monitor. Examples of events to monitor include, without limitation, changes in routable/non-routable, changes in IP address, changes in domain resolution, unique resolution, name server change, content record change for domain (registrant), new SSL certificate on IP, osint on domain/IP change, domain/IP on blacklist, discovery of keyword(s), or a change in any artifact about an asset. The rules may be generated based on input requesting to monitor an artifact for an asset. Monitoring may be applied to an asset that is merged between two projects where the asset was being monitored in one project.

Monitor manager 126 may perform processing on network data for monitoring events related to an asset. The monitoring may include using data provided by network data analyzer 122 and/or data handler 130. Monitoring may be active or passive. Active monitoring may include inspecting network data and/or communicating with one or more external systems or data sources to determine network data to assess rules for monitoring. Passive monitoring may include assessing network data that is collected by through passive techniques.

Monitoring manager 126 may implement processes to present and/or communicate a notification about an event detected by monitoring. Graphical interfaces may be presented with a visual and/or auditory notification about an event detected by monitoring. Monitoring manager 126 may facilitate communication, to a destination (e.g., a device or an address), of a notification about an event that is detected by monitoring. The presentation and notification about an event may include information about the event and/or the asset which is the subject of the event as well as information about projects in which the asset is associated. Information related to implementation of monitoring 136 may be stored in data store 132.

Even once a user is able to obtain passive and active network data, a user may be faced with an entire new set of challenges as each source may use its own unique data format. Network analysis system 120 may implement a deconfliction process on the network data to adjust (e.g., normalize) the network data to a common or standardized format from different formats of the network data obtained from different sources. In some embodiments, data handler 130 may perform processing, such as normalizing network data to a format in which data sets may be determined for an attribute according to a time period. Deconfliction may include adjusting the network data obtained from different sources so that data is aligned for a time period. The network data may include network data having same or different formats and/or covering different time periods. Data handler 130 may adjust network data to a format for a desired time period. The network data may be adjusted so that network data having different formats can be in a format having particular attributes and/or covering a particular time period. In some embodiments, network data may be processed to remove duplicate information. The network data can be further processed to identify a portion or subset of the network data for multiple time intervals (e.g., days) of a timescale defining a time period (e.g., a series of months). The subset of the network data for each of the time intervals may indicate information about network activity, such as IP address resolution for an Internet domain name or Internet domain name resolution for an IP address.

The following is an example of network data produced by deconfliction. Below is an example of a first record:
{
   'firstSeen': '2016-01-01',
   'lastSeen': '2016-03-01',
   'resolve': '8.8.8.8',
   'value': 'www.google.com',
   'source': 'riskiq',
   'recordType': 'A',
   'resolveType': 'ip_address'
}
Below is an example of a second record:
{
   'firstSeen': '2015-08-01',
   'lastSeen': '2016-06-01',
   'resolve': '8.8.8.8',
   'value': 'www.google.com',
   'source': 'another',
   'recordType': 'A',
   'resolveType': 'ip_address'
}
Deconfliction would result in the following data set based on the first data set and the second data set. The resulting data set can be a combination of multiple data sets having some or all of the same attributes. The data for some attributes may be combined or not included whether the same attribute is not found in the data sets being processed.
{
   'firstSeen': '2015-08-01',
   'lastSeen': '2016-06-01',
   'resolve': '8.8.8.8',
   'value': 'www.google.com',
   'source': ['riskiq', 'another'],
   'recordType': 'A',
   'resolveType': 'ip_address'
}
Based on the aggregated data, network analysis system 120 can perform operations to store and retrieve network data corresponding to the different time intervals for a time period. Network analysis system 120 may process the network data to identify network activity that can be presented in a heat map graphical interface described below. Network analysis system 120 may use network data store 132 to store data mapping network activity for time intervals (e.g., a day) over a time period (e.g., months). Network analysis system 120 can generate one or more data structures that store information about network activity (e.g., IP address resolution for an Internet domain name or Internet domain name resolution for an IP address). The information may be stored such that unique network activity is identified for the time interval for display in a heat map interface. The network activity may be mapped or linked to one or more data records including the information for the network activity. Data handler 130 may be configured to perform operations disclosed herein as being performed for handling data, such as aggregation and generating data.

Network analysis system 120 (e.g., data handler 130) may perform operations for managing data about network activity corresponding to interesting events that are identified.

The network data stored by network analysis system 120 may be searchable and associated with one or more attributes (e.g., an IP address, a time period, a domain, a source, etc.) related to the data. Data for analysis may be identified based on one or more attributes. The attribute(s) can be specified by input from a user. The attributes may be used to flag network activity interesting to a user based on criteria specified by the user in the graphical interfaces described below. In some embodiments, network analysis system 120 may identify a pattern of malicious and/or non-malicious network activity based on the stored network data. The pattern may be identified according to the network data stored for different time intervals over a time period. Patterns may be further identified based on one or more attributes specified by the user. The attributes may be used to selectively monitor network activity with respect to those attribute(s). For example, network analysis system 120 can determine unique IP address resolutions for an IP address specified by a user. Network analysis system 120 may implement operations to identify and access the network data to display in any of the graphical interfaces disclosed herein. The operations may be implemented by network analysis system 120 to support features of the present disclosure.

Project manager 124 may implement techniques disclosed herein for managing projects. Project manager 124 may generate data records for each asset which is included in a project. Information for implementing a project may be stored in projects 134 of data store 132. A project may be managed as a logical container of information about assets. The logical container may be implemented using one or more data storage containers. A data record for each asset may be stored in a project. The data record for an asset may be a copy of or a reference to a data record generated based on network data for that asset. Projects may be associated with each other with respect to relationships between assets in a project. Access to projects may be managed based on a role of a user. Projects can be managed as public (accessible to anyone) or private (restricted to a group of users). The data for a project may include information disclosed with reference to examples in this disclosure. Projects may be merged with respect to one or more assets. A project may be updated to include the data records for merged assets.

Interface manager 128 may implement interfaces to enable functionality of projects and monitoring. Interface manager 128 can implement graphical interfaces as disclosed herein including handling of processing interactions to detect input for operations using the graphical interfaces. Interface manager 128 may provide a programming interface, such as an application programming interface (API). The programming interface may be defined by one or more parameters for receiving information to configure a project and/or monitoring. A client may communicate a request defined using the API to manage a project and/or monitor assets using techniques disclosed herein.

Data handler 130 may implement techniques to manage a relationship or association between network data about assets. The relationships in network data may be associated with projects and monitoring.

II. Processes for Analysis of Network Activity

Figure 2:
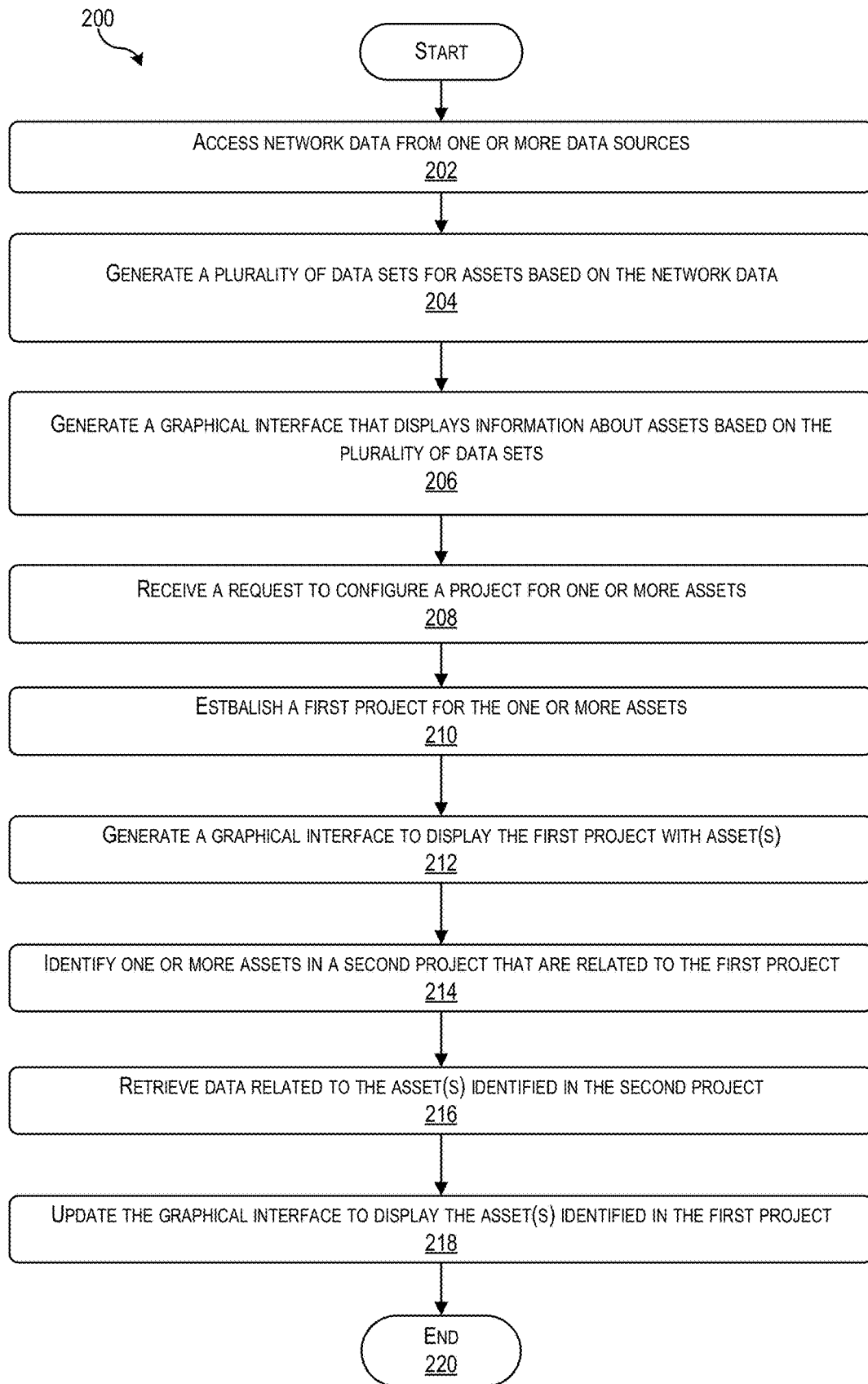
FIG. 2 illustrates a flowchart of a process of implementing a project of artifacts about network-based assets according to some embodiments.
Figure 3:
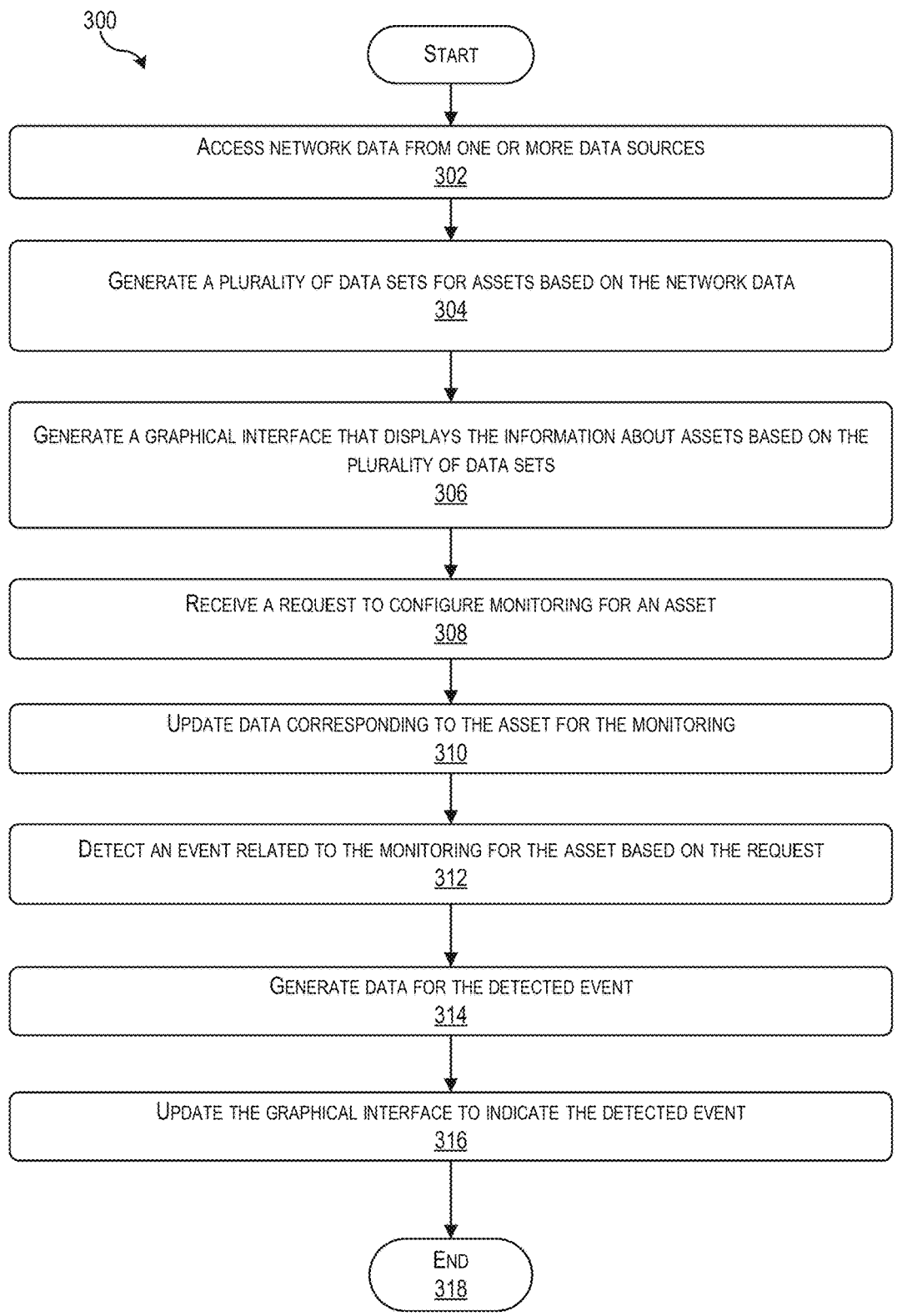
FIG. 3 illustrates a flowchart of a process of monitoring network-based assets according to some embodiments.

FIGS. 2 and 3 illustrates examples of processes of network analysis according to some embodiments. These processes may be implemented by network analysis system 120 of FIG. 1. FIG. 2 illustrates a flowchart 200 of a process of implementing a project of artifacts about network-based assets according to some embodiments. FIG. 3 illustrates a flowchart 300 of a process of monitoring network-based assets according to some embodiments.

Flowchart 200 begins at block 202 by accessing network data from one or more data sources. The network data may be accessed for a time period. The network data may include Domain Name System (DNS) data for one or more Internet domain names or IP addresses. The DNS data may include active DNS data, passive DNS data, or both. Data handler 130 of FIG. 1 may perform operations disclosed with reference to block 202.

In some embodiments, the network data may be adjusted for a time period based on first network data and second network data included in the network data. The first network data may have a first format. The second network data may have a second format that is different from the first format. The network data may be adjusted by implementing a deconfliction process. The adjusting may include generating network data that is normalized, or has a format common to one or more attributes of the data.

At block 204, based on the network data, a plurality of data sets are generated. The plurality of data sets (e.g., a plurality of data records) may be generated based on one or more attributes specified by a user. Each of the plurality of data sets may corresponds to a different one of a plurality of time intervals within a time period. The data sets may be generated based on identifying the network data corresponding to an attribute. For example, an attribute is an Internet domain name or an IP address. Where the attribute is an Internet domain name, each data set in the plurality of data sets may indicate one or more IP addresses that have been resolved for the Internet domain name. Network data analyzer 122 and data handler 130 of FIG. 1 may perform operations disclosed with reference to block 204.

At block 206, an interface (e.g., a graphical interface) may be generated that displays the information about assets based on the plurality of data sets. Information for each unique network asset may be displayed for a time interval. The data sets corresponding to the network asset may be used to display information about each unique network asset including artifacts about the network asset.

In some embodiments, the graphical interface may be a heat map. For example, the graphical interface may include a plurality of interactive elements, such as interactive tiles. Each interactive element may show network data in the data set corresponding to the interactive element for a time interval. Although shown in a particular visual representation, the interactive elements may be shown according to one or more criteria, without limitation to embodiments illustrated in this disclosure. The interactive elements may be shown based on the corresponding data sets that satisfy one or more attributes. In one example, the plurality of data sets may be shown in the graphical interface based on an attribute of an Internet domain. An interactive element may not be displayed for each data set, and instead can be displayed for multiple data sets with regard to information common or related to the data sets.

The generated graphical interface may be displayed. Network analysis system 120 may generate the graphical interface and cause the graphical interface to be displayed at a device, e.g., a client. The graphical interface may be sent to the device, which displays the graphical interface.

At block 208, a request is received to configure a project for one or more assets. The request may be received through the graphical interface. The graphical interface may be interactive to enable a project to be configured for one or more assets. The request may indicate the one or more assets to associate with the project.

At block 210, a project (e.g., a first project) is established based on the request. A project may be defined by the attribute(s) specified in the request. The project may be identified and associated with the asset(s) specified in the request if the project already exists. Otherwise, data may be created to establish a project. The data sets associated with the asset(s) may be stored or associated with the project.

At block 212, a graphical interface is generated to display the project with one or more assets. A graphical interface for a project may be displayed according to techniques disclosed herein. The graphical interface may have functionality such as the examples provided in FIGS. 4-29.

At block 214, one to more assets in a project (e.g., a second project) are identified as being related to the first project. Assets may be identified manually based on interaction with the graphical interface to merge or copy assets from another project. Assets may be identified automatically based on one or more rules. Assets may be related based on one or more artifacts about those assets. The assets may be identical to one or more assets in the first project.

At block 216, the data related to the asset(s) in the second project may be retrieved. The data may be stored in association with the first project. The data may be merged where an asset in the first project is the same or related to an asset in a second project. At block 218, the graphical interface for the project is updated to display the assets identified in the first project. Where assets are shared between the first project and the second project, the assets may be updated to reflect additional information about the assets obtained from the second project.

Flowchart 200 may end at block 220.

Flowchart 300 may be implemented similar to all or part of flowchart 200. Flowchart 300 may begin at block 302 by accessing network data from one or more data sources. The network data may be accessed for a time period. The network data may include Domain Name System (DNS) data for one or more Internet domain names or IP addresses. The DNS data may include active DNS data, passive DNS data, or both. Data handler 130 of FIG. 1 may perform operations disclosed with reference to block 302.

In some embodiments, the network data may be adjusted for a time period based on first network data and second network data included in the network data. The first network data may have a first format. The second network data may have a second format that is different from the first format. The network data may be adjusted by implementing a deconfliction process. The adjusting may include generating network data that is normalized, or has a format common to one or more attributes of the data.

At block 304, based on the network data, a plurality of data sets are generated. The plurality of data sets (e.g., a plurality of data records) may be generated based on one or more attributes specified by a user. Each of the plurality of data sets may corresponds to a different one of a plurality of time intervals within a time period. The data sets may be generated based on identifying the network data corresponding to an attribute. For example, an attribute is an Internet domain name or an IP address. Where the attribute is an Internet domain name, each data set in the plurality of data sets may indicate one or more IP addresses that have been resolved for the Internet domain name. Network data analyzer 122 and data handler 130 of FIG. 1 may perform operations disclosed with reference to block 304.

At block 306, an interface (e.g., a graphical interface) may be generated that displays the information about assets based on the plurality of data sets. Information for each unique network asset may be displayed for a time interval. The data sets corresponding to the network asset may be used to display information about each unique network asset including artifacts about the network asset.

In some embodiments, the graphical interface may be a heat map. For example, the graphical interface may include a plurality of interactive elements, such as interactive tiles. Each interactive element may show network data in the data set corresponding to the interactive element for a time interval. Although shown in a particular visual representation, the interactive elements may be shown according to one or more criteria, without limitation to embodiments illustrated in this disclosure. The interactive elements may be shown based on the corresponding data sets that satisfy one or more attributes. In one example, the plurality of data sets may be shown in the graphical interface based on an attribute of an Internet domain. An interactive element may not be displayed for each data set, and instead can be displayed for multiple data sets with regard to information common or related to the data sets.

The generated graphical interface may be displayed. Network analysis system 120 may generate the graphical interface and cause the graphical interface to be displayed at a device, e.g., a client. The graphical interface may be sent to the device, which displays the graphical interface.

At block 308, a request is received to configure monitoring for an asset. The request may be received through the graphical interface. The request may include information indicating the criteria (e.g., one or more attributes) for monitoring.

At block 310, data corresponding to the asset(s) to be monitored are updated to be associated with data for monitoring. The graphical interface may be updated to indicate the asset(s) that are requested to be monitored. The criteria may be specified for monitoring the asset for all events.

At block 312, an event is detected based on the criteria for monitoring. Network data may be analyzed periodically to identify network data related to an asset. The network data may be actively or passively analyzed to determine whether an event is detected for the criteria.

At block 314, data is generated for the event. The data may be stored in association with the data for the asset. At block 316, update the graphical interface to indicate the detected event for the asset. One or more projects may be updated to indicate the detected event. The graphical interface may be updated with a visual appearance to indicate the detected event.

Flowchart 300 may end at block 318.

III. Interactive Graphical Interfaces of a Network Analysis System

Illustrative embodiments of the present disclosure are described in detail below with reference to FIGS. 4-29. FIGS. 4-29 illustrate examples of graphical interfaces in accordance with some embodiments. Specifically, features in the disclosure may be implemented in or with functionality of any of the graphical interfaces (e.g., a "heat map") disclosed in herein. A graphical interface may be generated based on network data obtained by a network analysis system (e.g., network analysis system 120). The graphical interface may display information about network data based on one or more criteria provided by a user via the graphical interface. Specifically, the graphical interface may display artifacts obtained from network data for one or more network-based assets. The graphical interface may be modified to display additional information or one or more additional graphical interfaces such as those described with reference to the following figures. In response to interaction with a graphical interface as disclosed herein, a network analysis system can perform processing to produce the information for an updated or new graphical interface and can produce the updated/new graphical interface.

In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface such as a heat map for which network data is displayed. For a computer system that displays any of the graphical interfaces disclosed herein, the computer system can receive one or more inputs corresponding to an interaction with a graphical interface. The input(s) can be processed to determine the interaction(s) to the graphical interface.

a. "Heat Map" Interface for Monitoring and Managing Projects

Figure 4:
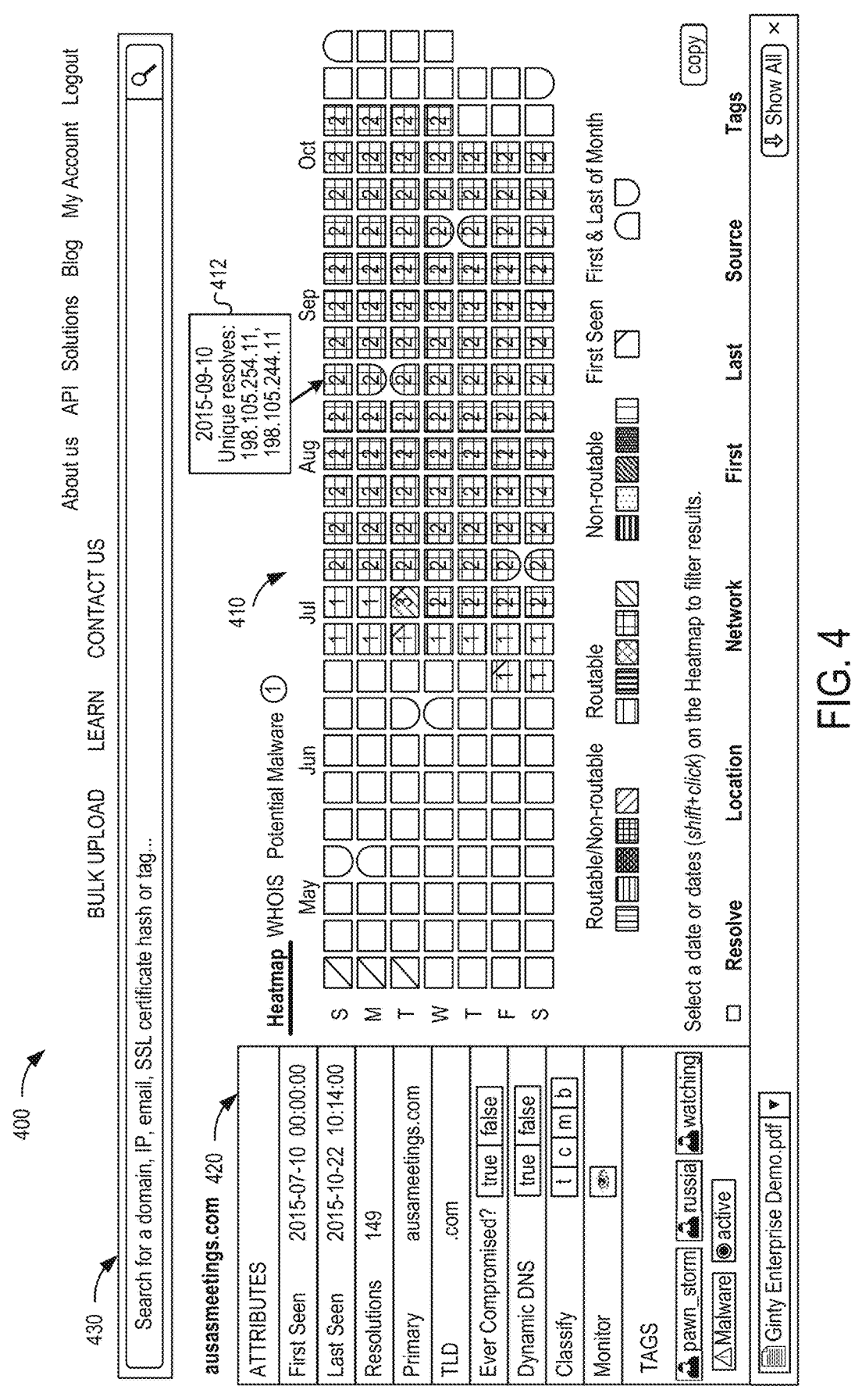

Now turning to FIG. 4, a graphical interface 400 is shown that is interactive for enabling network analysis. Graphical Interface 400 includes a graphical interface 410 ("heat map") displaying network data for a time period. Graphical interface 400 can include a menu interface 420 ("Summary View") of attributes related to the network data corresponding to the interactive elements. Graphical interface 400 includes a search interface 430 that is interactive to receive input to search network data obtained by network analysis system 120. A user can provide the input that specifies a type of network data, a time period for identifying network data, one or more attributes of network activity, other information to define network data, or combinations thereof.

Search interface 430 may be interactive to receive input indicating one or more criteria for specifying the network data to view in graphical interface 410. The criteria may include a type of network data (e.g., a domain name, an IP address, an email address, or SSL certificate information). The criteria may indicate a time period (e.g., a range of months or a specific start date and end date) for which to display the network data. The criteria may include any attribute (e.g., an attribute of network data) that can be used to identify a subset of network data. In some embodiments, the criteria include an interval (e.g., hourly, daily, or weekly) for which to display network data within the time period. Based on the input to search interface 430, network analysis system 120 can obtain and generate one or more graphical interfaces within information based on network data corresponding to the search criteria.

In the example shown in FIG. 4, graphical interface 410 shows network data about an Internet domain name ("ausameetings.com") for a time period starting in May and ending in October. Graphical interface 410 illustrates an example of IP address resolved for the Internet domain name during the time period. Information in network data may be displayed by one or more tiles of graphical interface 410. A tile is shown as a square in graphical interface 410. One or more tiles may correspond to an interactive element. In the example shown in FIG. 4, graphical interface 410 includes interactive elements, each of which corresponds to a tile in graphical interface 410.

Based on criteria provided by a user (e.g., criteria input via search interface 430), network analysis system 120 can determine a subset of the network data for the Internet domain name within the time period. Network analysis system 120 can search and retrieve the subset of network data (e.g., network data 170) based on identifying the subset matching the criteria (e.g., the Internet domain name and the time period). As explained above, network analysis system 120 can produce a plurality of data sets based on the network data. A data set in the plurality of data sets may indicate information about multiple network events. The plurality of data sets may be produced according to the criteria specified by the user. For example, the network data, once obtained for the time period, is processed to produce a plurality of data sets for the Internet domain name during the time period. Each of the plurality of DNS data sets may correspond to a different one of a plurality of time intervals within the time period. Each of the time intervals may be identical based on a time interval specified by as criteria by the user.

Graphical interface 410 may be generated based on the plurality of data sets. Each of the tiles in graphical interface 410 may display information based on a different one of the plurality of data sets. In at least one embodiment, each of the tiles is an interactive element to control display of additional information about the network data in the data set corresponding to the interactive element. The additional information may be based on the underlying information of the data set. As will be explained later, a graphical interface (e.g., graphical interface 400) may be modified or regenerated to include an additional interface that displays the network data (e.g., data records) corresponding to the data set for an interactive element upon interaction with the interactive element. Graphical interface 410 may be generated to show data that can be seen, and if not may be dynamically modified to display data according to interaction with graphical interface 410.

Each interactive element corresponding to a tile in graphical interface 410 may display information about network activity for the data set corresponding to the interactive element. The information may be displayed in response to interaction with the interactive elements. The information may indicate information defining the scope of the network activity, such as a date or time range for an interval corresponding to a data set. For example, graphical interface 410 may be modified to displays information (e.g., a date) about important network activity occurring in the network data for a tile for which interaction occurs. The information may be displayed as an element or a graphical interface 412. The information may display network activity for the time interval corresponding to the network data. The information may indicate one or more unique IP addresses resolved for a domain name. If the graphical interface 410 is for an IP address, then the information may indicate one or more unique domain name that have resolved for the IP address. The information displayed by graphical interface 412 can include any information determined from network data for the tile.

Menu interface 420 may present a summary of information about attributes overall in the network data corresponding to the tiles displayed in heat map interface 410. Menu interface 420 may include one or more interactive elements to selectively control display (e.g., filter) of the network data viewed in heat map interface 410. The interactive element(s) may control a time period, resolutions, IP address, domain, top-level domain, and other analytical measures that can be used to filter the network data based on which information is displayed in graphical interface 410. Menu interface 420 may display information related to one or more attributes of data in the interface 410. For example, menu interface 420 may display information related to the interactive element(s)

that are interacted with (e.g., selected or mouse-over). The information may include customer settings (e.g., tags or classifications) related to the network data.

In some embodiments, graphical interface 400 may include one or more elements ("Monitor") for monitoring one or more network-based assets. The interactive elements may be interactive to configure one or more attributes for monitoring network assets. In some embodiments, attributes for monitoring may be configured in a different graphical interface. Menu interface 420 may provide one or more interactive elements for specifying attributes that are applicable to the network assets identified in the underlying network data.

One or more operations may be performed for monitoring network assets. Operations may include providing a presentation of a notification of monitoring for one or more network assets identified in the underlying network data. The presentation of the notification may be visual, auditory, or both. A notification of monitoring may correspond to a change in a network assets being monitored. The presentation may indicate the change in the network asset. The data displayed for an asset may be visually presented in a way to indicate the change in the network asset. Examples of changes for monitoring network assets include, a change between routable and non-routable for a domain, a change in an IP address, and a resolution of a domain to a different name server. In some embodiments, one or more interactive elements may be presented, either in the heat map or a different graphical interface to indicate an artifact or a change in an artifact for an asset that is being monitored.

As explained above, network analysis system 120 can generate statistical information about network activity based on network data in one or more network data sets. The statistical information may indicate network activity such as a total number of resolutions (e.g., domain resolutions for an IP address or IP address resolutions for a domain name), a total number of different domain name resolutions, a total number of different IP address resolutions, information defining a time interval (e.g., a date or time range), or other information about network activity that can be determined based on network data. The statistical information may be displayed in a tile and the statistical information may be based on the network data for the tile. Graphical interface 410 can display statistical information computed for each of the plurality of DNS data sets corresponding to a tile. The statistical information may be displayed according to a timescale defined by a plurality of time intervals. Each interactive element of the plurality of interactive elements can correspond to a different one of the plurality of DNS data sets and can indicate the statistical information computed for the different one of the plurality of DNS data sets. In some embodiments, the appearance of a tile as indicated by its profile may be modified based on the statistical information, such that the appearance conveys a meaning of the statistical information.

In some embodiments, the appearance of a tile and/or the information in the title may be presented to indicator information about monitoring of an artifact of an asset or the asset. The title may include information about an asset that is monitored.

Figure 5:
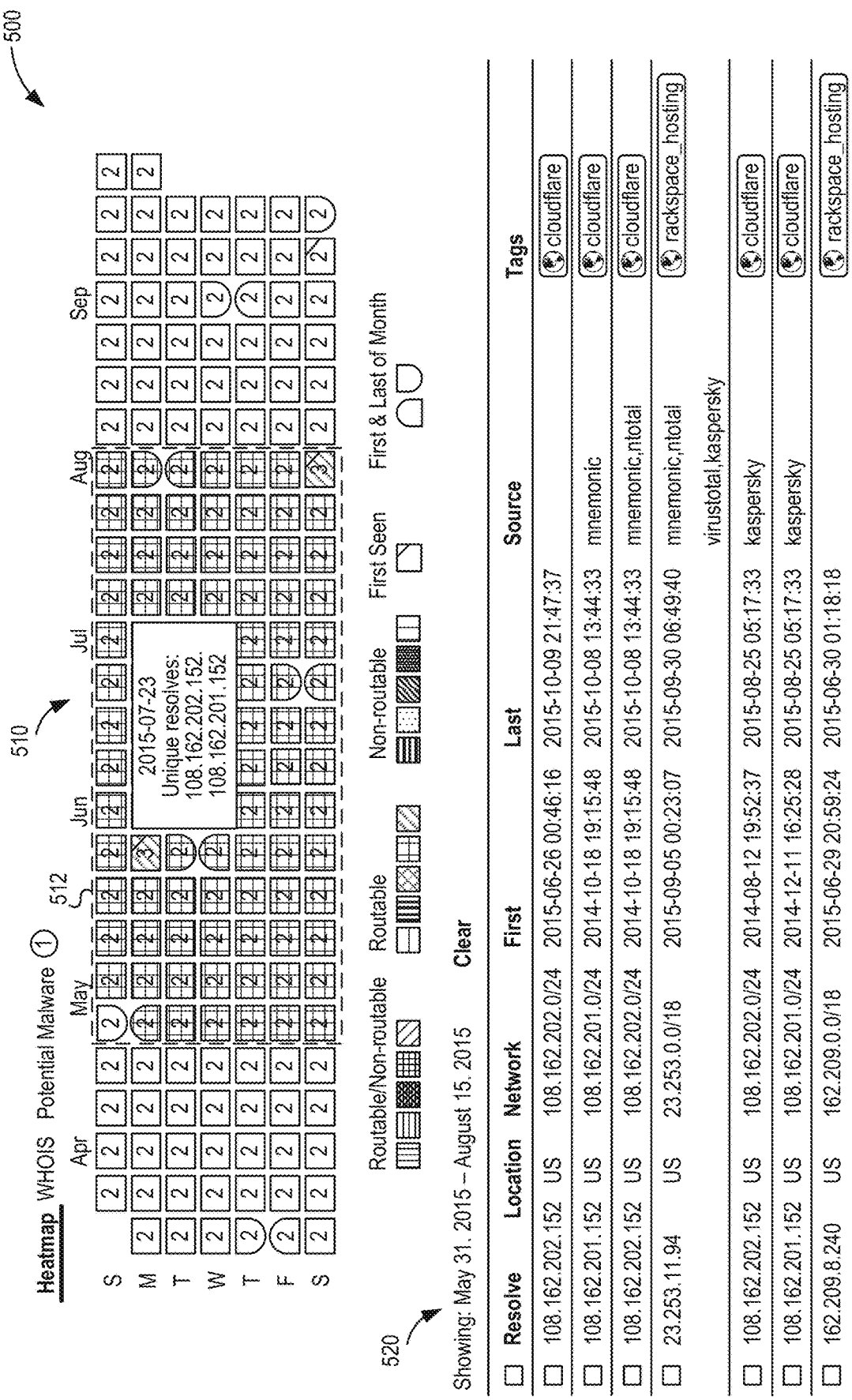

In some embodiments, any of the graphical interfaces in FIG. 4 may be implemented to indicate one or more projects associated with an artifact of an asset or an asset identified in the network data. An interactive element may be presented for each project to enable the project to be presented.

b. Monitor(s) and Project(s) Accessibility in Data Record Interface for Heat Map FIG. 5 illustrates an example of a graphical interface 500 for displaying network data. Similar to FIG. 4, graphical interface 500 can include the elements such as those described with reference to graphical interface 400. Network data may be displayed in a graphical interface 510 including tiles, each represented by an interactive element displaying different data set of a plurality of data sets based on network data, where each data set corresponds to a different time interval. In the example of FIG. 5, each interactive element corresponds to a data set of network data for a time interval of a calendar day. Graphical interface 510 may display network data in a manner as described for graphical interface 410 of FIG. 4.

A tile in a heat map, such as graphical interface 510, may be interactive to cause graphical interface 500 to be updated or modified to display one or more data records of the network data for the data set corresponding to the tile. In at least one embodiment, interaction with a tile (e.g., selection or of a tile) may cause graphical interface 500 to be modified so that it includes a graphical interface 520 ("data record interface"). For example, network analysis system 120 may receive input for the interaction. Based on the input, network analysis system 120 may generate a new graphical interface or modify graphical interface 500, either of which include data record interface 520.

Data record interface 520 may display information about each of the data records in the network data corresponding to the tile with which the interaction occurs. The data record(s) may include the information which is displayed in the tile or in an interface about the network data corresponding to the tile. Information from or about each of the data records may be displayed. The information may be displayed from each data record. The information may indicate one or more attributes for each IP address indicated by the data record as being resolved for a domain. The one or more attributes may indicate a location of the resolved IP address, a network address for resolving the IP address, a first time the IP address was resolved, a last time the IP address was resolved, a source of the IP address that is resolved, and one or more tags associated with the resolved IP address. The tag(s) may be user-defined with respect to a particular IP address.

The information displayed in data record interface 520 may include all or some of the data records in the network data corresponding to the tile. In some embodiments, data record interface 520 may display a subset of all the data records in the network data. A data record may include information about one or more IP addresses that have been resolved for a domain name, or one or more domain names for which have been resolved for an IP address. In one example, each data record in the subset may be a distinct or unique data record in all of the data records based on which the information is displayed in the tile or in an interface. In other words, a distinct record may include information that is different from all of the other data records. In another example, the data records in the subset may each be distinct with regard to a specific network event that has been identified based on the information in all the data records. In some embodiments, data record interface 520 may display information for multiple records, where each record includes information about a single IP address that has been resolved for a domain name or each record may include information about a single domain name which has resolved for an IP address. For example, one row shown in data record interface 520 may include information from multiple data records that share an attribute or relate to a network activity for an IP address or a domain name. Data record interface 520 may be interactive to adjust (e.g., scroll) the view to display additional and/or different data records.

In some embodiments, all or a portion of the information displayed for a data record may be interactive for monitoring assets. Based on the attribute(s) specified for monitoring, all or a portion of the information displayed for a data record may be visually presented to indicate an event for the monitoring with respect to the attribute(s). In some embodiments, all or a portion of a row corresponding to a data record may be interactive to configure monitoring for the asset or an artifact associated with the asset. Interaction with the tile for monitoring may cause one or more data records to be displayed with a visual appearance of a monitoring event. The visual appearance of each row corresponding to a data record may change as events are detected. The information displayed for each data record may indicate one or more attributes that are being monitored or that some aspect of data for a row is being monitored.

In some embodiments, graphical interface 500 may include one or more interactive elements to selectively filter the data records for which information is displayed in data record interface 520. For example, graphical interface 500 may be interactive to enable a user to specify a time period and/or one or more attributes (e.g., IP address, location, network, first time IP address resolved, last time IP address resolve, a source, or tags) for selectively filtering the data records for which information is displayed in data record interface 520. Data record interface 520 may be interactive to filter records based on one or more columns or attributes.

In some embodiments, each row in the data record interface 520 may display information about one or more projects in which the asset or an artifact of an asset is associated with. For example, the information in a row for a data record may indicate one or more projects in which that asset is associated with. Each row for a data record may be interactive to enable a user to provide input to specify that an asset or an artifact corresponding to the information in the row is associated with a project. Each row may be presented with a visual appearance to indicate a project to which the asset or artifact in the row is associated with. Each row may be interactive to perform management operations for projects as disclosed herein.

In another example, graphical interface 510 may be interactive to specify a time period for network activity by interacting with one or more controls, such as shift-click and selecting one or more interactive tiles. Multiple tiles may be selected such that the information displayed in data record interface 520 will be for data records for which information is displayed in the selected tiles. Multiple consecutive or non-consecutive tiles may be selected. Data record interface 520 may display information indicating the criteria (e.g., the time period and/or one or more attributes) for which information is displayed in data record interface 520. In the example shown in FIG. 5, data record interface 520 is shown with information obtained from multiple data records for a time period (e.g., May 31, 2015-Aug. 15, 2015). In the example, the time period for the data records may be chosen by selecting multiple tiles in graphical interface 510 corresponding to the time period. Based on selection of the tiles, the information from the data records may be obtained and displayed in data record interface 520 for different IP address resolutions for a domain name previously selected for the graphical interface 510.

c. Graphical Interfaces for Projects and Monitoring

Figure 6:
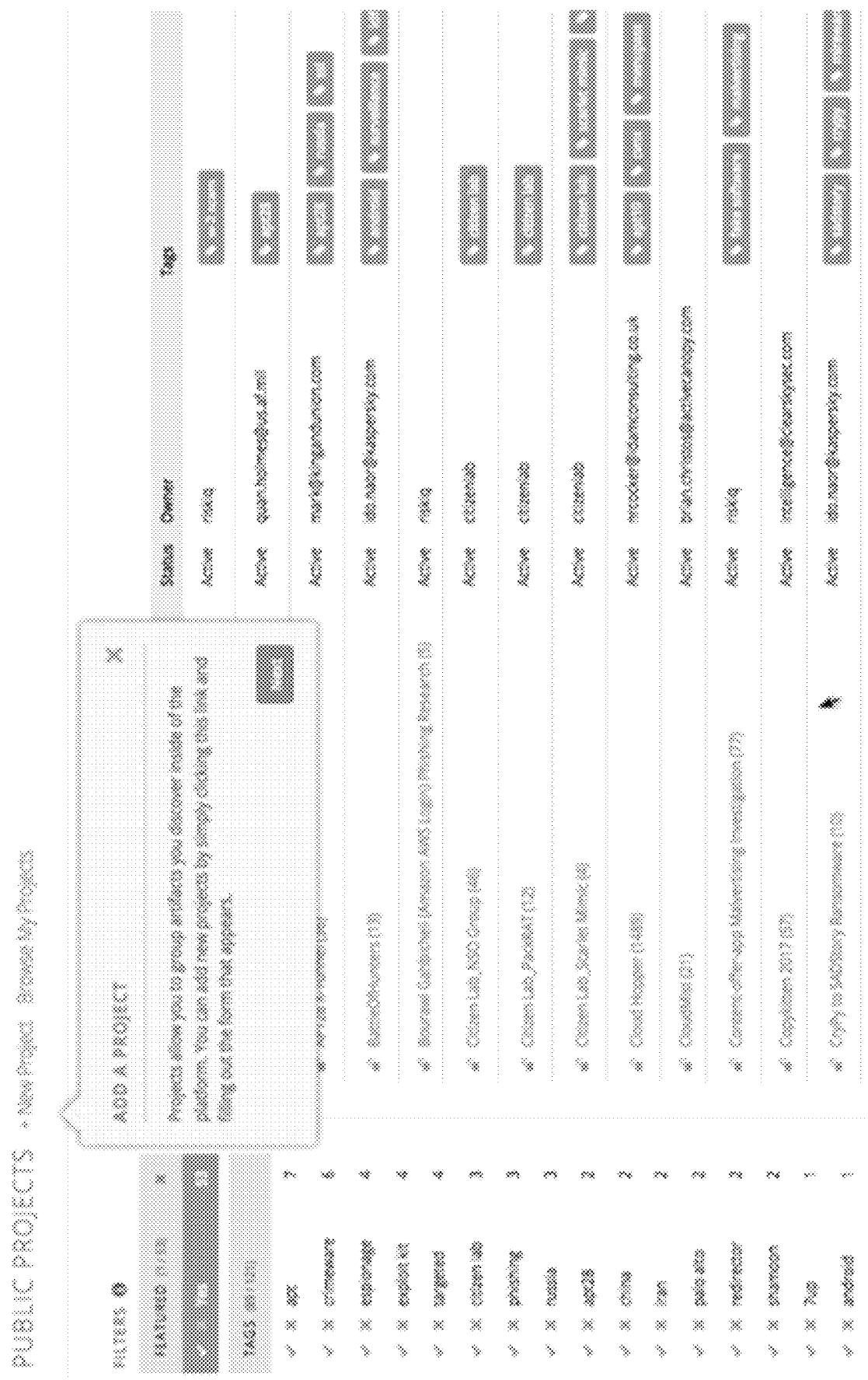

FIG. 6 illustrates a graphical interface for managing (e.g., create, read, update, and delete) projects according to some embodiments. The graphical interface may enable access to public and/or private projects. Access to projects may be based on access permitted to a user according to the role of the user. The graphical interface may be interactive or may enable another graphical interface that is interactive to manage a project.

Figure 7:
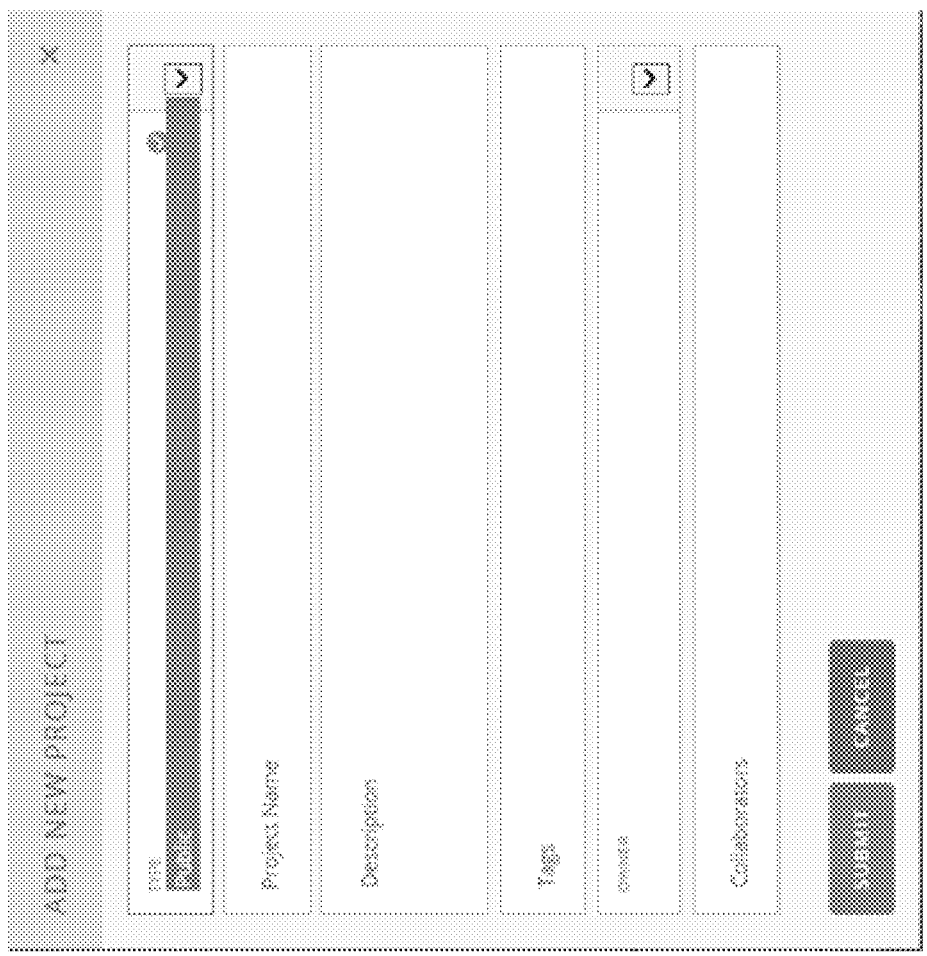

In at least one embodiment, the graphical interface may include one or more interactive elements to add a new project. For example, FIG. 7 illustrates a graphical interface for adding a project. In FIG. 7, the graphical interface enables a user to provide input to specify details about a project including, without limitation, a type of project (e.g., public or private), a name of a project, a description of the project, one or more tags for the project, an owner (e.g., an email address) of the project, and one or more collaborators (e.g., users) that are permitted to contribute to the project. In some embodiments, the graphical interface enables a user to specify one or more attributes for monitoring.

The graphical interface may include one or more interactive elements to view a project. Projects of different types (e.g., public or private) may be viewed or browsed. Projects may be viewed depending on the access an individual has to the projects. Any project may enable one or more users to manage artifacts about assets that are analyzed as part of an investigation of network activity. A project can enable multiple users to concurrently aggregate artifacts about assets of interest. The project can show who added an artifact so artifacts can be assessed or managed with respect to each users contribution.

The graphical interface may display one or more projects that are accessible to a user. For example, the graphical interface may include one or more additional graphical interfaces. Each project may be associated with a data record. The information in a data record about each project may be displayed in many ways, such as a tabular format. Each entry or row may correspond to data for a data record of a project. The information displayed for a project may include one or more attributes. Examples of attributes include, without limitation, a name of the project, a status of the project, an owner of the project (e.g., a name or contact information), and/or one or more tags. Each project displayed in the graphical interface may be interactive to cause a graphical interface to be displayed that provides information about each asset in the project.

FIG. 8 illustrates an example of a graphical interface of a team project according to some embodiments. The graphical interface displays information about multiple projects accessible to a team. In some embodiments, the information displayed for each project may include a "monitor profile" which is associated with projects created for a particular purpose. Each project may be displayed with information about alerts ("Alerts") that have been configured for the project and/or that have been issued for an asset in the project.

Figure 9:
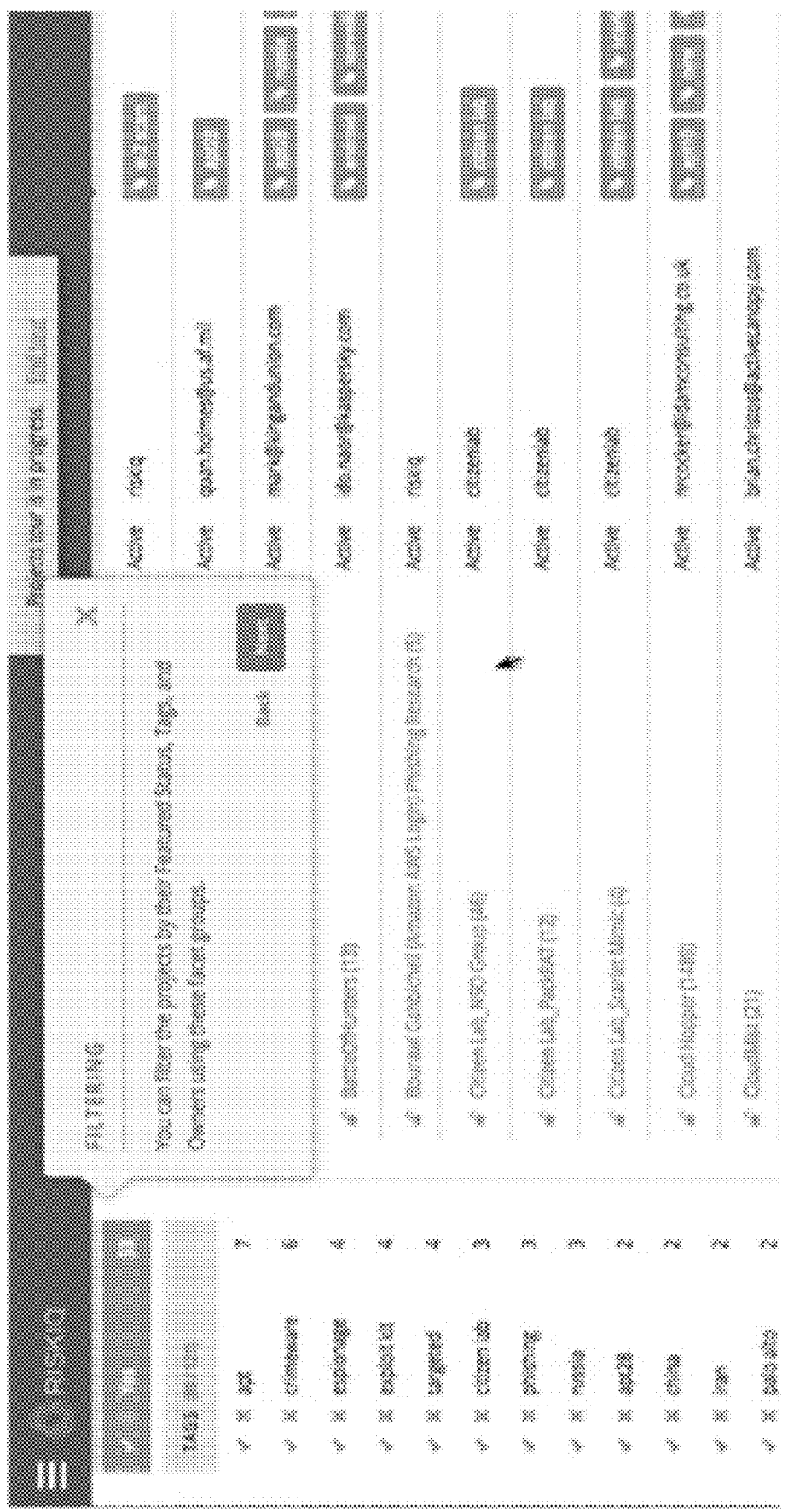

FIG. 9 illustrates a graphical interface that displays information about projects. The graphical interface may be interactive to enabling filtering of the projects that are displayed in the graphical interface. As discussed above with reference to FIG. 6, each row displayed corresponding to a project may include information about an attribute for that project. Each project may be filtered with respect to one or more attributes. The graphical interface may include one or more interactive elements to select attributes for filtering projects. The attributes may include the values of each unique attribute for each of the types of attributes in each project. Filtering may be performed by selecting the values for the attributes a user desires to filter.

Figure 10:
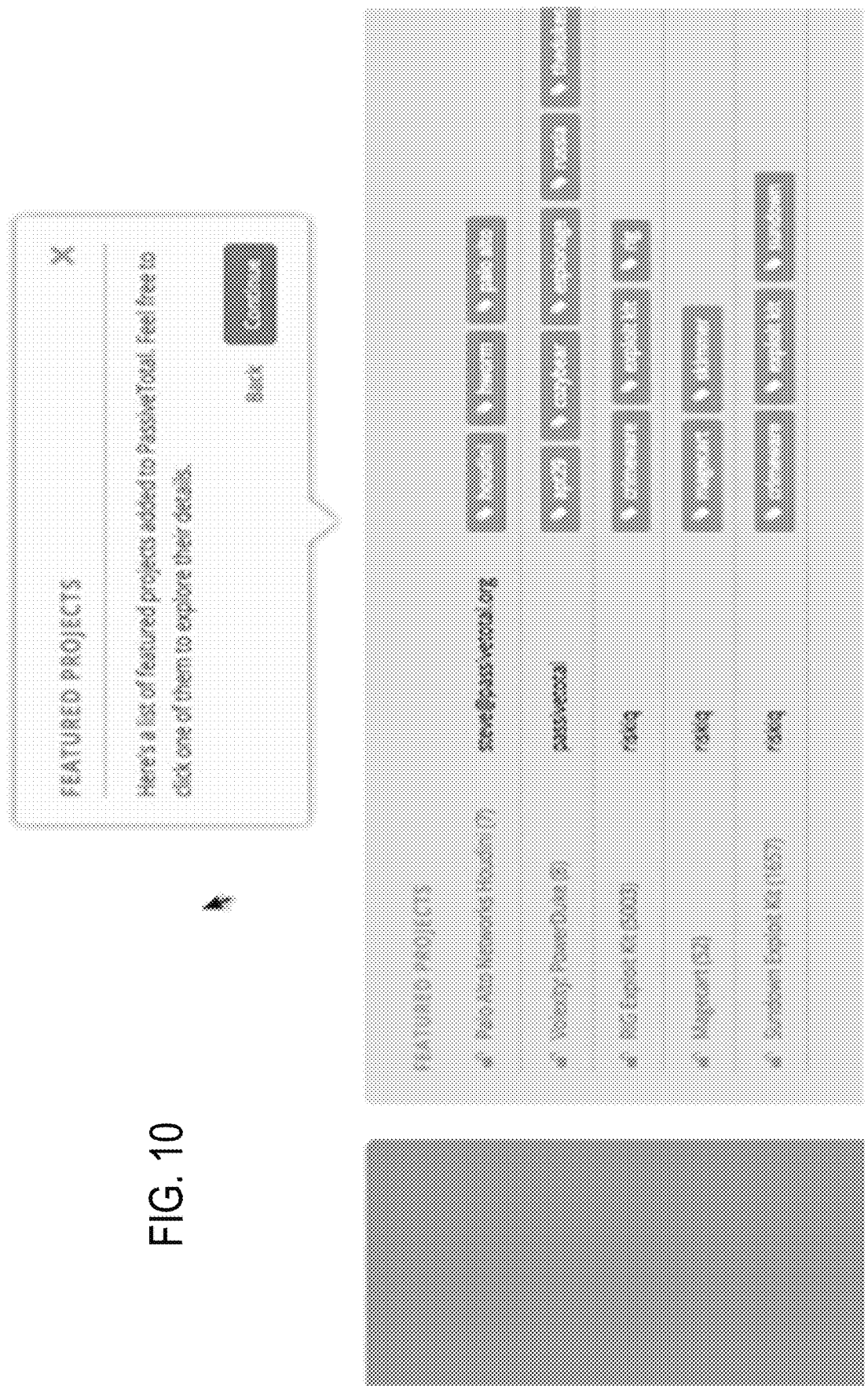

FIG. 10 illustrates a graphical interface that displays one or more projects that are featured. Each project displayed may be interactive to view details about that project. Featured projects may include public and/or private projects, or projects having particular attributes.

Figure 11:
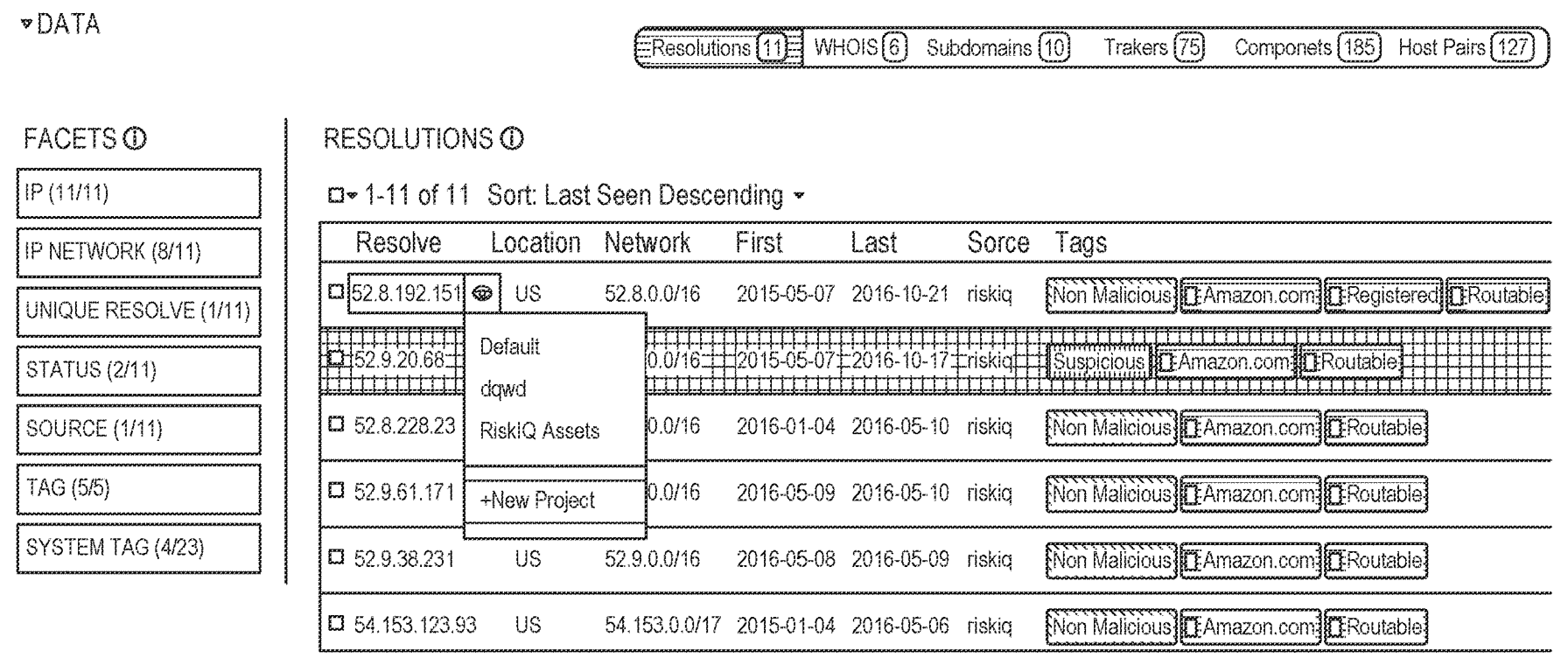

FIG. 11 illustrates a graphical interface that displays information for artifacts corresponding to different network assets. Specifically, the information for artifacts are displayed in a row for each network asset. In the example of FIG. 11, artifacts are presented for each unique IP address that has been resolved. Some portions of the data for an asset can be presented with an interactive element to specify a project to which to add the asset. For example, each unique IP address may be presented with an interactive element to specify a project. The interactive element may provide a list of projects accessible to the user. In some embodiments, the artifacts for an asset may be presented with tags and/or information identifying one or more projects that include the asset.

FIG. 12 illustrates a graphical interface of information displayed about artifacts in a single view. Each artifact identified in the graphical interface may correspond to a unique asset. Each artifact is displayed with information including, but not limited to, a type of artifact, a date of creation, a creator who identified the artifact, a context of where the artifact was discovered, and one or more monitors associated with the artifact. The artifacts may be displayed with information about one or more projects that include the artifact. The graphical interface may be interactive to enable a user to pivot on an artifact to view other information about the artifact.

Figure 13:
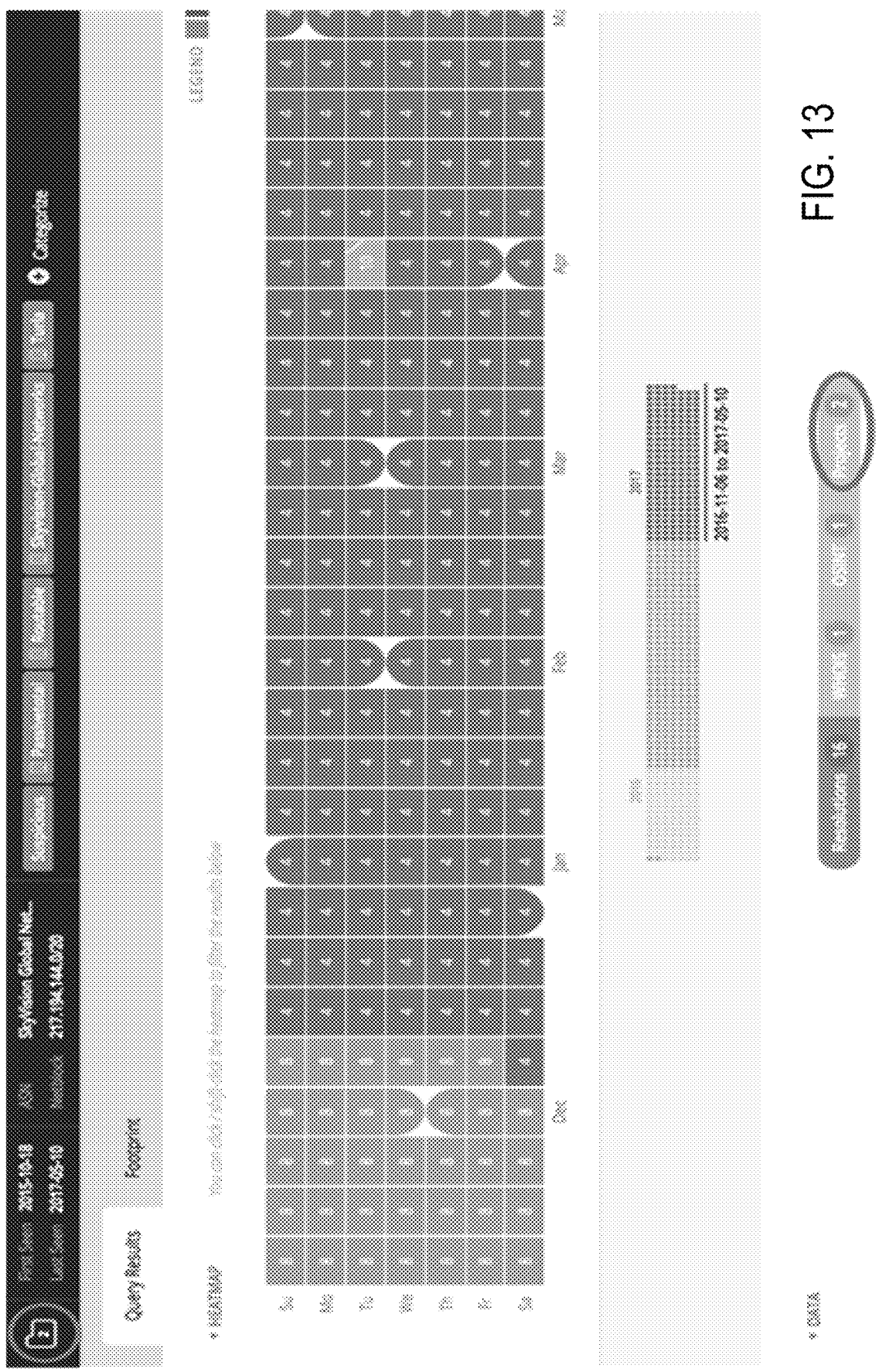
Figure 14:
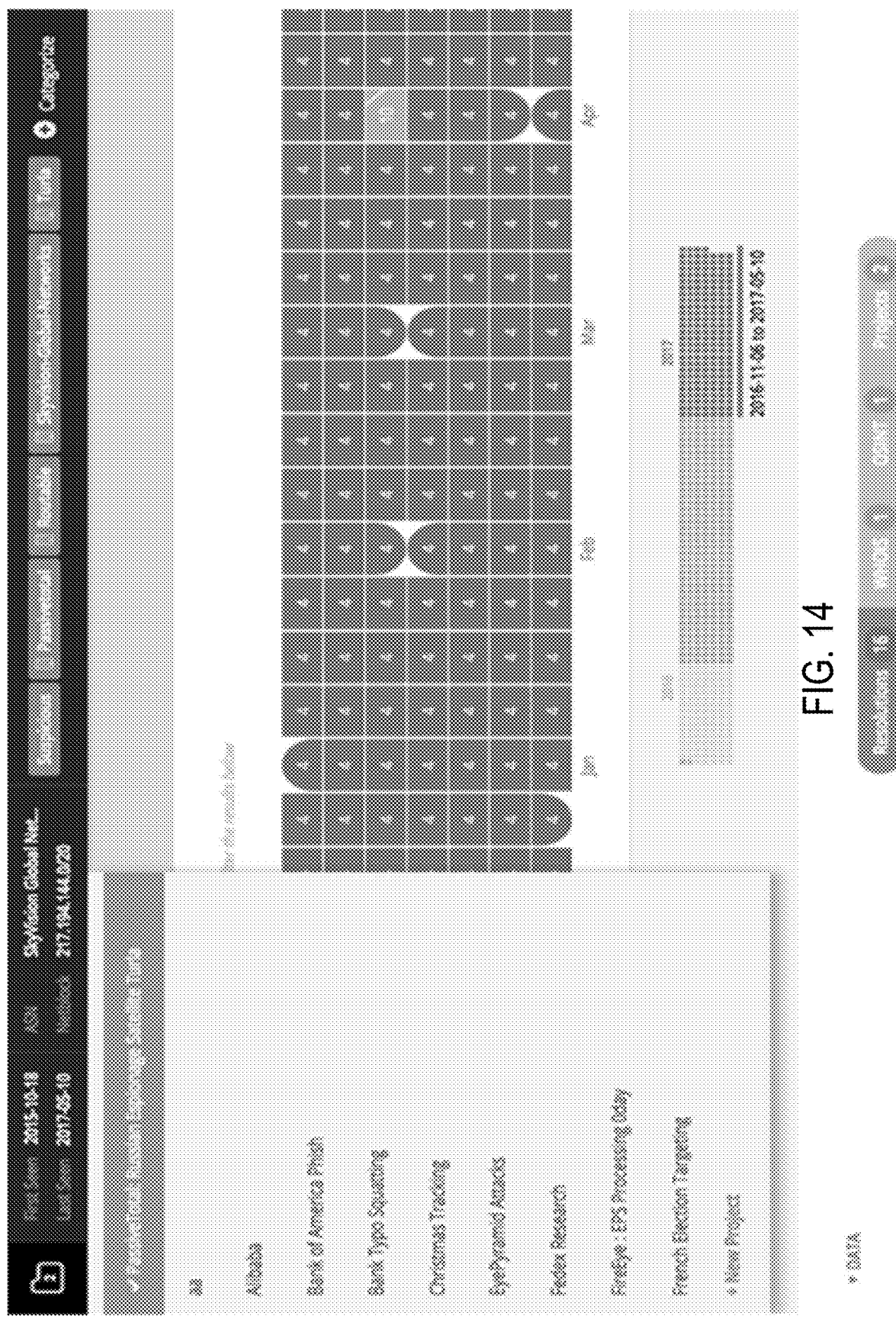
Figure 15:
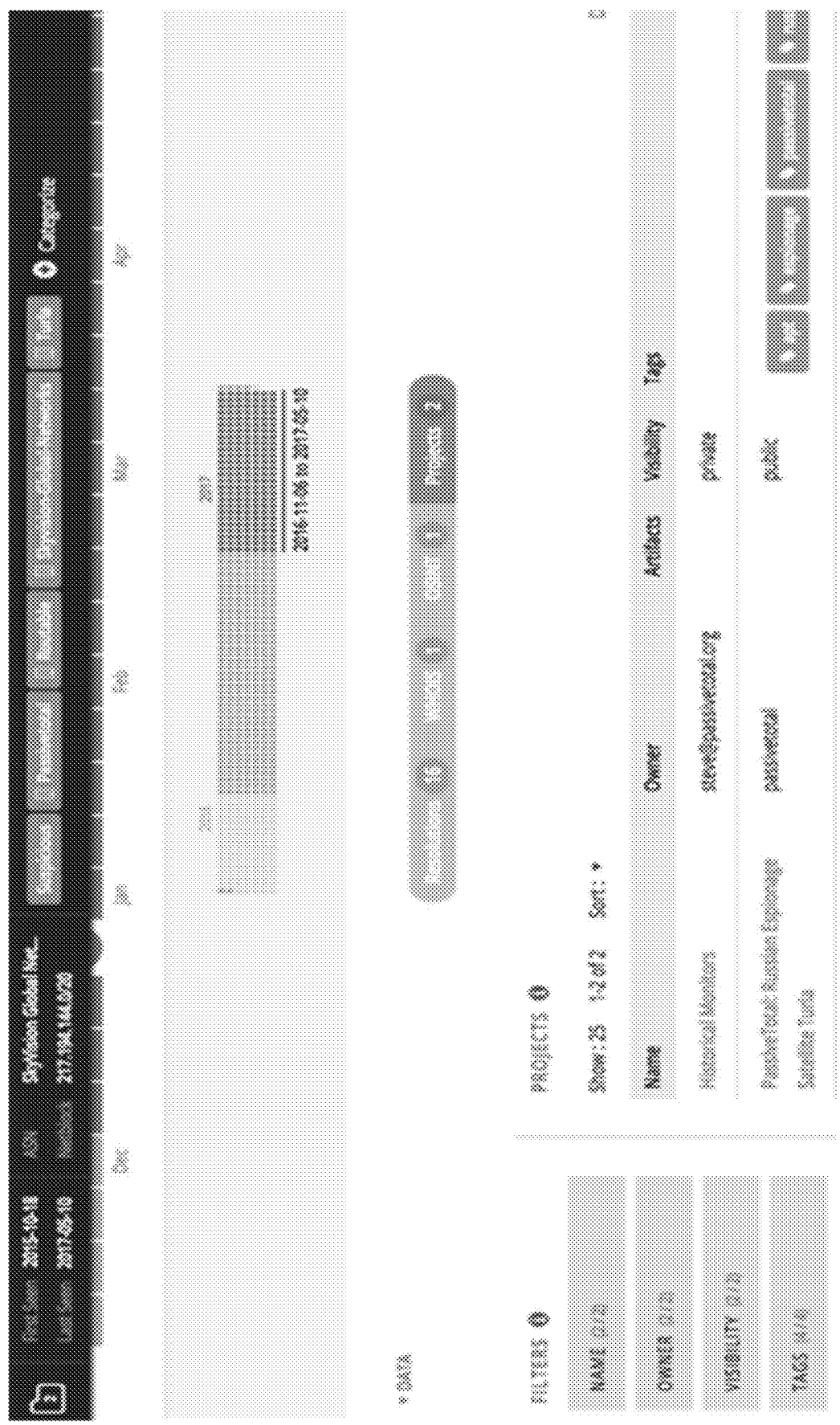

FIG. 13 illustrates a graphical interface of a heat map interface according to some embodiments. As discussed above, the heat map interface may be interactive to cause data about network assets to be displayed in a data record interface below the heat map interface. In this example, the graphical interface may be interactive to display information about projects for which artifacts of assets are associated with. The artifacts are those which are tied to the underlying network data for the heat map interface. In the example of FIG. 13, a user inputs a query for IP address 217.194.149.111. Network data is processed to display the heat map interface based on the query. The project tab below displays projects in which the IP address is included. Continuing from the example of FIG. 13, FIG. 14 illustrates an example of the graphical interface of FIG. 13. In this example, the graphical interface is interactive to view a project file for a project that includes the asset for which the heat map interface is generated. FIG. 15 illustrates a graphical interface of a view of projects based on interaction with an interactive element ("Projects") shown in the graphical interface of FIG. 13. The graphical interface of FIG. 15 may include features in this disclosure with reference to other graphical interfaces of projects.

Figure 16:
Figure 17:
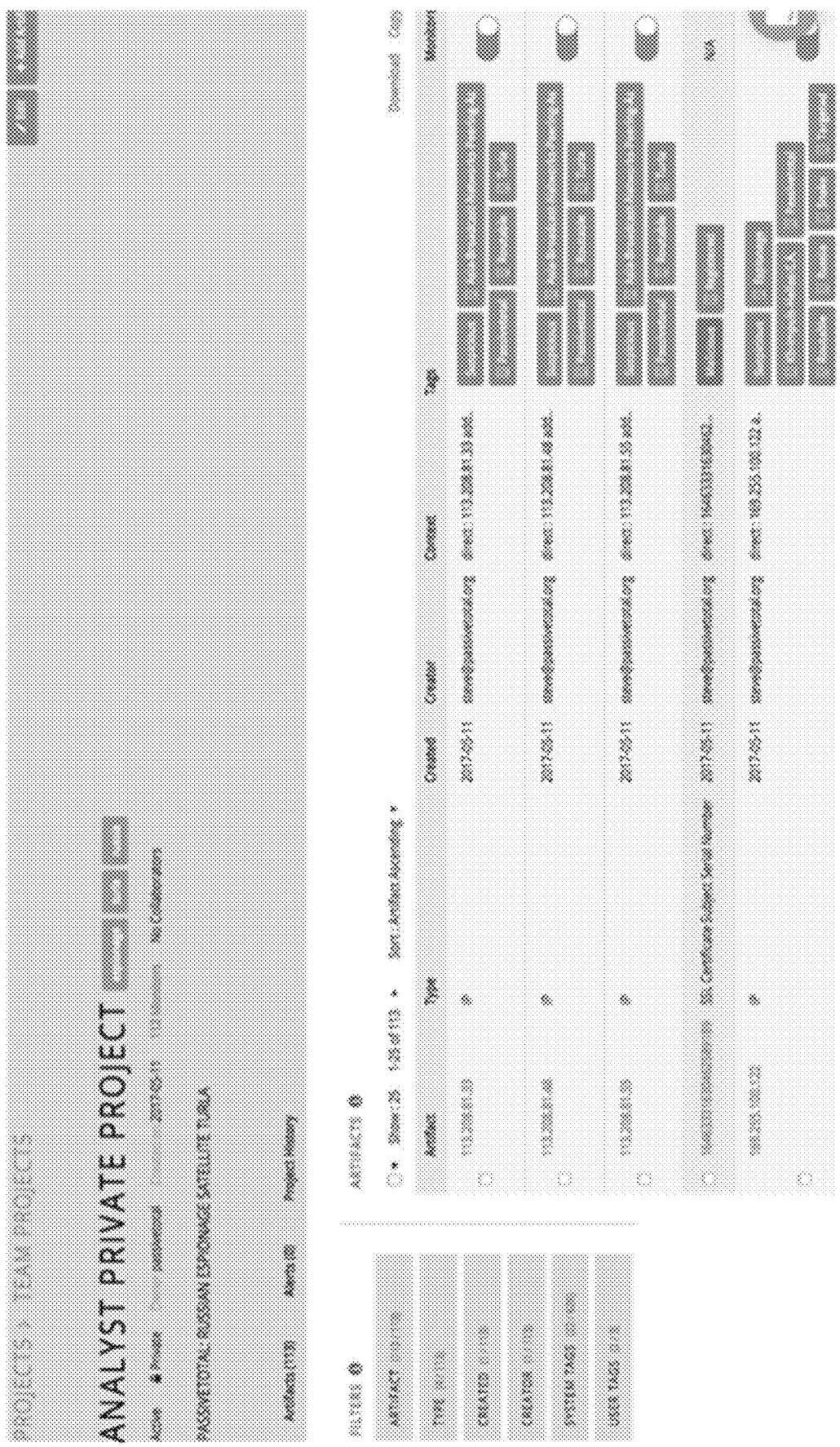

FIG. 16 illustrates a graphical interface of a project. The graphical interface may be displayed in response to interaction with a project shown in FIG. 15. In this view, the project is displayed with artifacts of network assets monitored in a project including the IP address that was shown in FIGS. 13-15. A graphical interface, such as the one shown in FIG. 16 for a project may include an interactive element ("Copy") to enable the artifact(s) to be stored in association with another project (e.g., a private project). This functionality enables a user to aggregate artifacts about assets of interest during an investigation. A user can also selectively identify one or more artifacts that are interesting. In some embodiments, artifacts in one project may be automatically stored (e.g., copied) in association with one or more projects. A graphical interface can be provided to enable a user to configure one or more rules for automatically moving one or more artifacts to a project. Generally, a project may be defined based on one or more rules based on which artifacts are added or deleted from a project based on the rules. For example, a rule may be configured to store an artifact in one project with all other projects accessible to a user that have the same artifact. Whether by manually or automatically, an artifact copied from one project to another that has the same artifact may result in merging of the underlying data for that artifact. A monitor on the same artifact in one project may be applied to the artifact in another project should the artifact be merged or copied into the project not having a monitor set for that artifact. In some embodiments, an artifact in a project may be displayed with information indicating other projects in which that artifact is associated. FIG. 17 illustrates a different project that shown in FIG. 16 from which an artifact was copied.

Figure 18:

FIG. 18 illustrates an example of a graphical interface of a project. As with other projects, the graphical interface enables a user to view alerts based on monitors configured for any or some of the artifacts. In some embodiments, the graphical interface may be interactive to view a history of the project including changes to the project and the actions that triggered them. The history may show other projects and/or rules based on which artifacts are included or excluded from a project. The history may be useful to determine a process for analysis of assets based on the artifacts discovered in a project. The history may show a trend with respect to time based on which artifacts are discovered.

Figure 19:
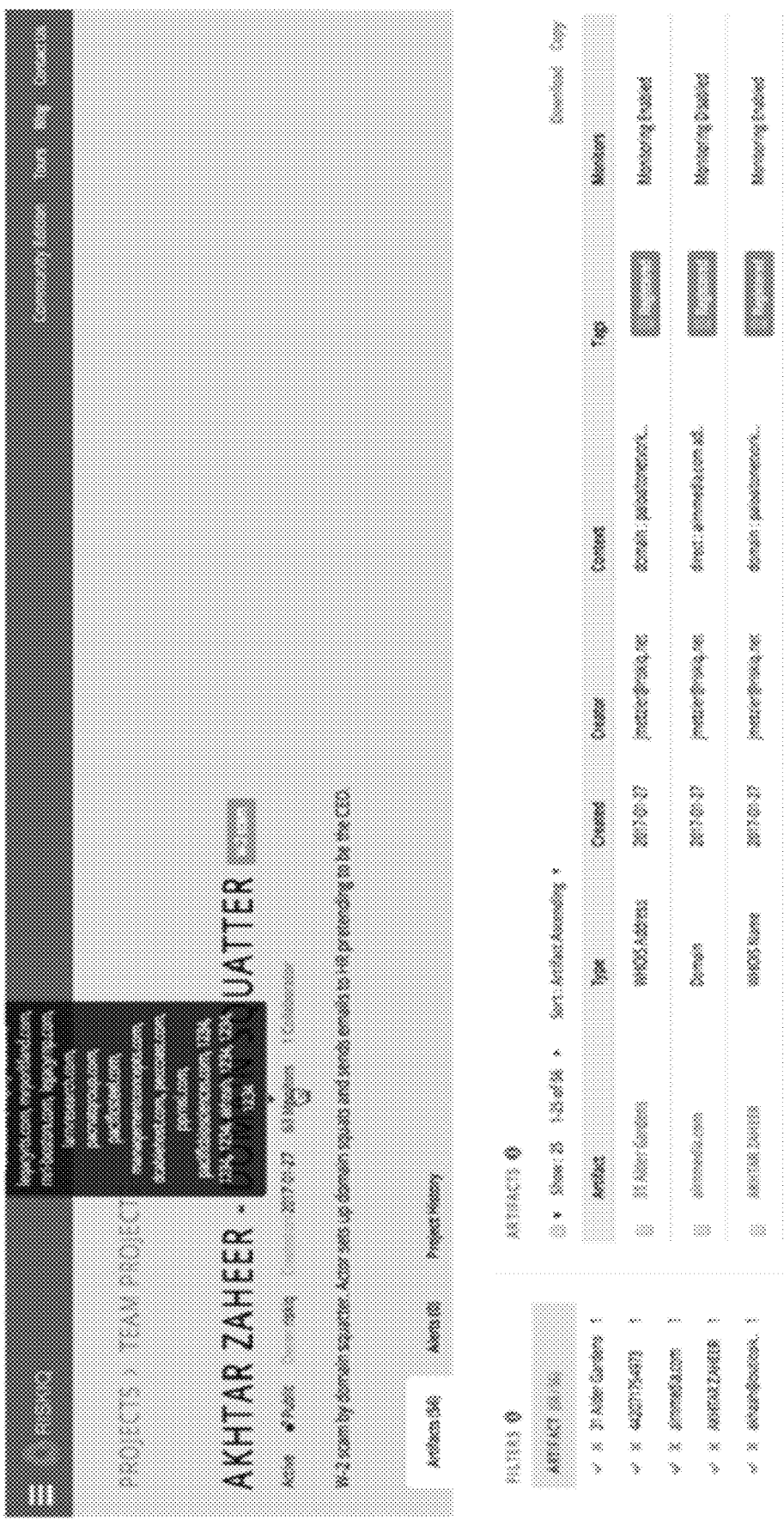

FIG. 19 illustrates another example of a graphical interface for managing projects and monitoring assets according to some embodiments. In this example, the graphical interface displays a row of data for each data record corresponding to an artifact for an asset managed in a project. In this example, each row is interactive to configure a monitor for the artifact. Interaction with an interactive element for a monitor may cause another graphical interface to be displayed. A monitor may be configured simply by toggling an interactive element. In some embodiments, a monitor may be configured such that one or more attributes are specified for monitoring. Monitoring may be configured with respect to an artifact, an artifact in a project, or rules defined based on the artifact. The artifact may be monitored for multiple projects depending on how monitoring is configured. In some embodiments, monitoring may be configured to identify other artifacts that may be related in some way, such as by project, or having information that is shared or connected. In this example, the graphical interface may be interactive to display one or more monitors configured for the project. Interaction with the graphical interface can reveal a view of each monitor and a status of monitoring the artifact.

Figure 20:

FIG. 20 illustrates another example of a graphical interface of projects accessible to a user. Interaction with a project may cause the graphical interface in FIG. 21 to be displayed. FIG. 21 illustrates an example of a graphical interface of artifacts displayed for a project "NOTROVE" for assessing a notrove scam actor. This project may be created to assess network activity of a prolific scam actor "NoTrove," who's name comes from a common theme observed in the uniform resource indicator (URI) pattern.

This actor's URLs almost always come with the parameters /tov= or /rov=, and are most commonly associated with fake rewards scams. Therefore, the name came together as No (Treasure) (T/R)ove, or NoTrove for short. The analysis includes a utility of projects and monitoring to detect network activity that poses a security threat. In this example, a project is public such that other can contribute artifacts discovered as part of NoTrove analysis. With high-entropy domains and constantly shifting hosting, NoTrove has burn through just under 2,000 domains and over 3,000 IPs. Combined with the 78 variations of campaign-specific middle-word variants and randomized hostnames, we've seen NoTrove operate across millions of FQDNs. Typically, one IP used by NoTrove will house a set of domains, but each campaign-specific *.domain.tld campaign variant will be hosted on its own IP. A project enables such analysis to be realized. Information in a project such as tags and artifacts may be useful for aggregating occurrences of NoTrove network activity discovered by multiple analysts.

Figure 22:
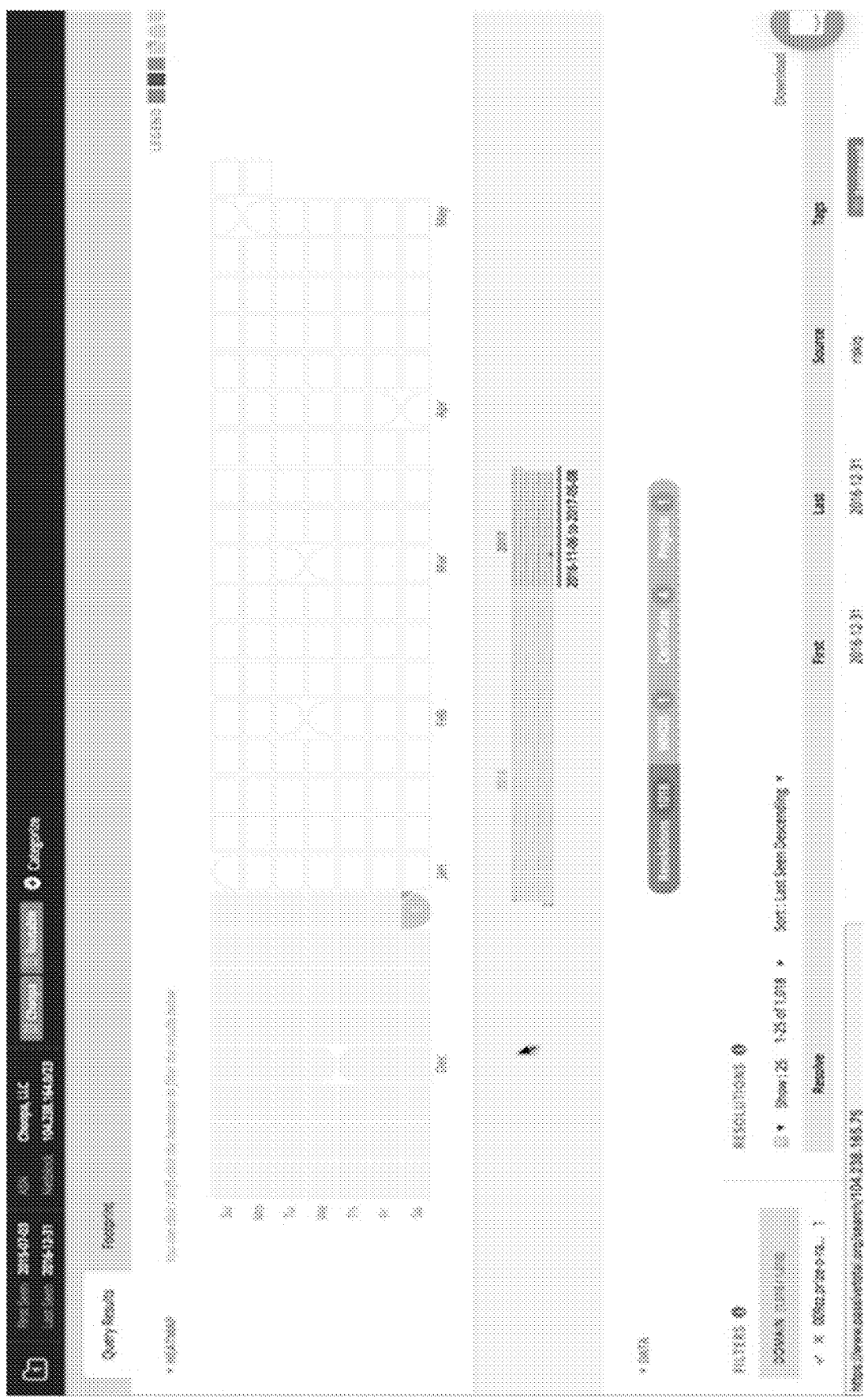
Figure 23:
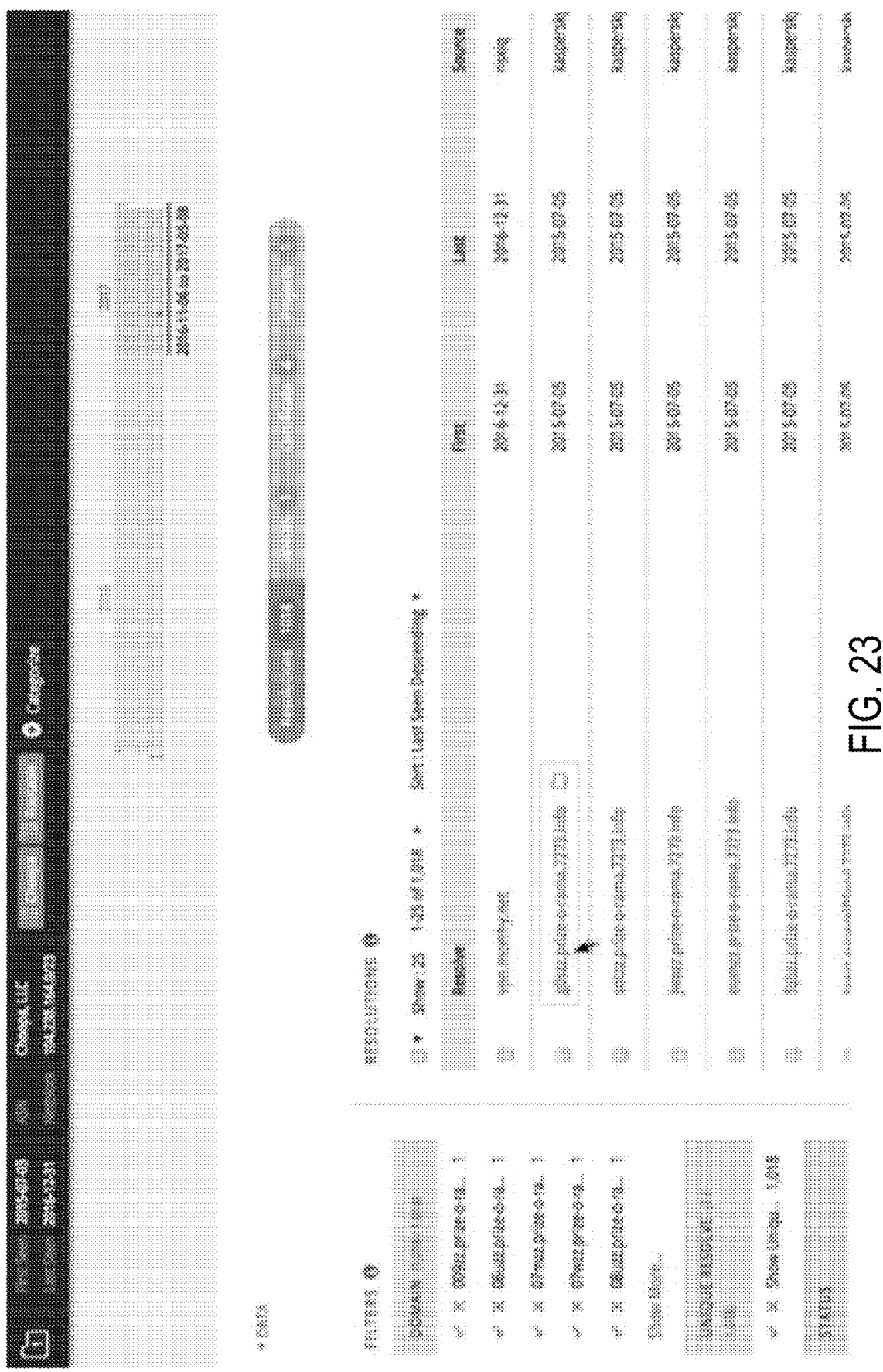
Figure 24:
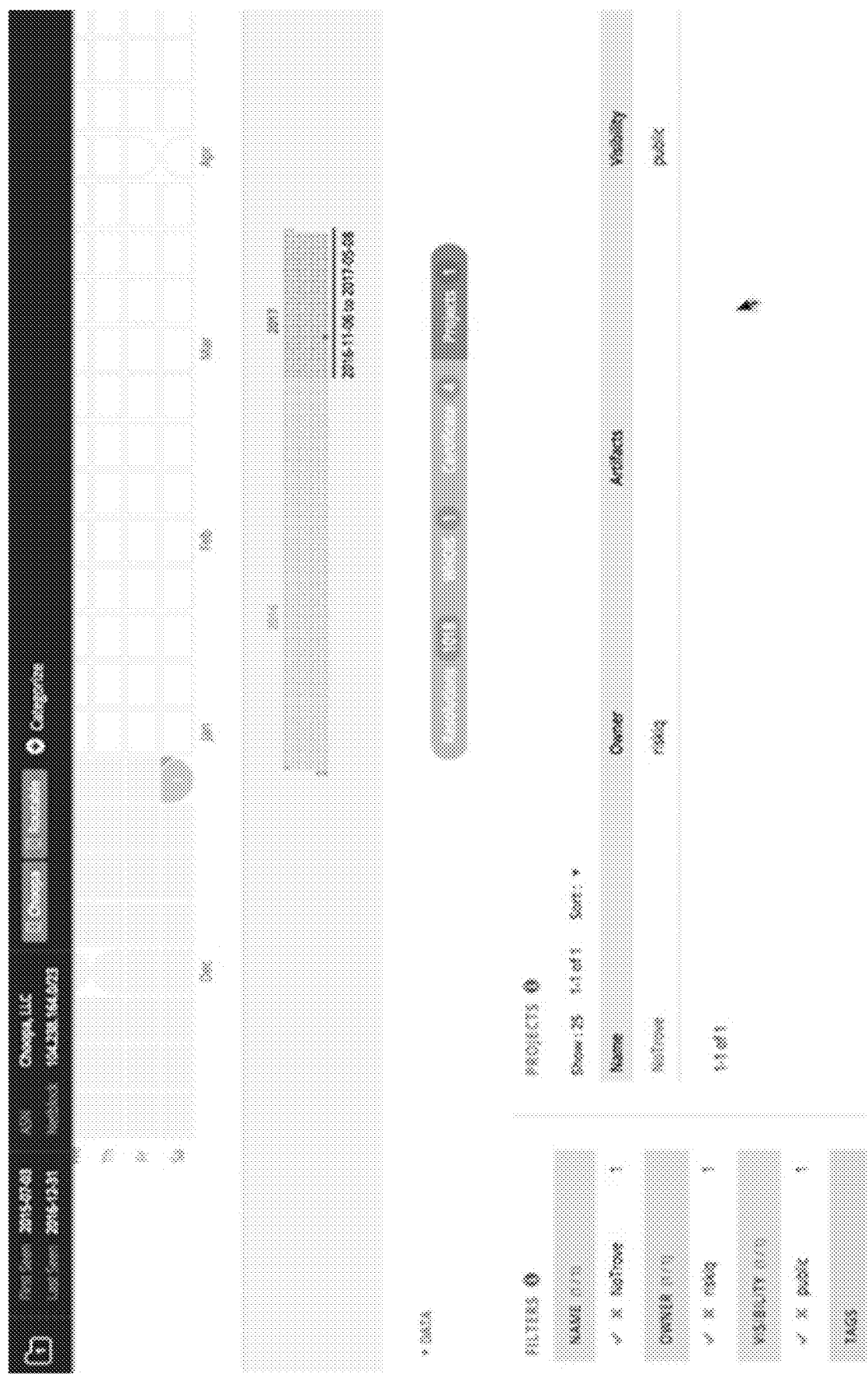
Figure 25:
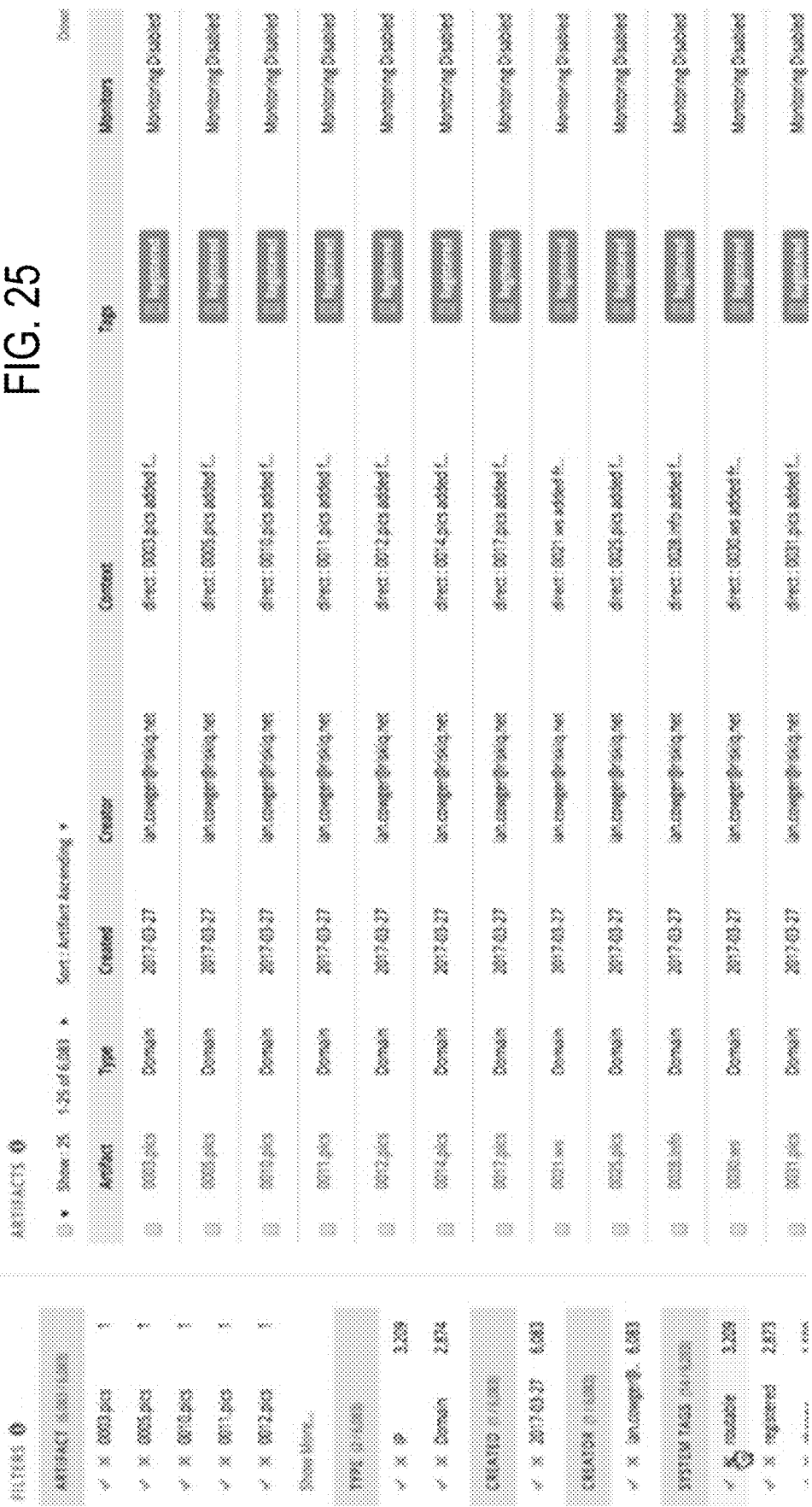

Interaction with an artifact in the graphical interface of FIG. 21 may cause the graphical interface of FIG. 22 to be shown with network data about that artifact. In FIG. 22 the graphical interface displays the underlying network data of an artifact. The network data may be shown in the display for resolutions of the asset and in the heat map interface. Continuing with the example of FIG. 22, FIG. 23 shows a view of all resolutions for the artifact selected in the project shown in FIG. 21. Thus, the project enables a user to pivot to an asset and then view the occurrences of network activity for that particular asset. The graphical interface displays an interactive element for "Projects" to toggle back to the project view. If other projects include the asset selected from the project in FIG. 21, then those projects would be displayed, such as shown in FIG. 24 of the graphical interface of projects. Interaction with the project in the graphical interface of FIG. 24 will result in the graphical interface of FIG. 25 showing the artifacts of the project. In this manner, a user can selectively move between artifacts through projects to view analysis by the same person or others with respect to related artifacts.

Figure 26:
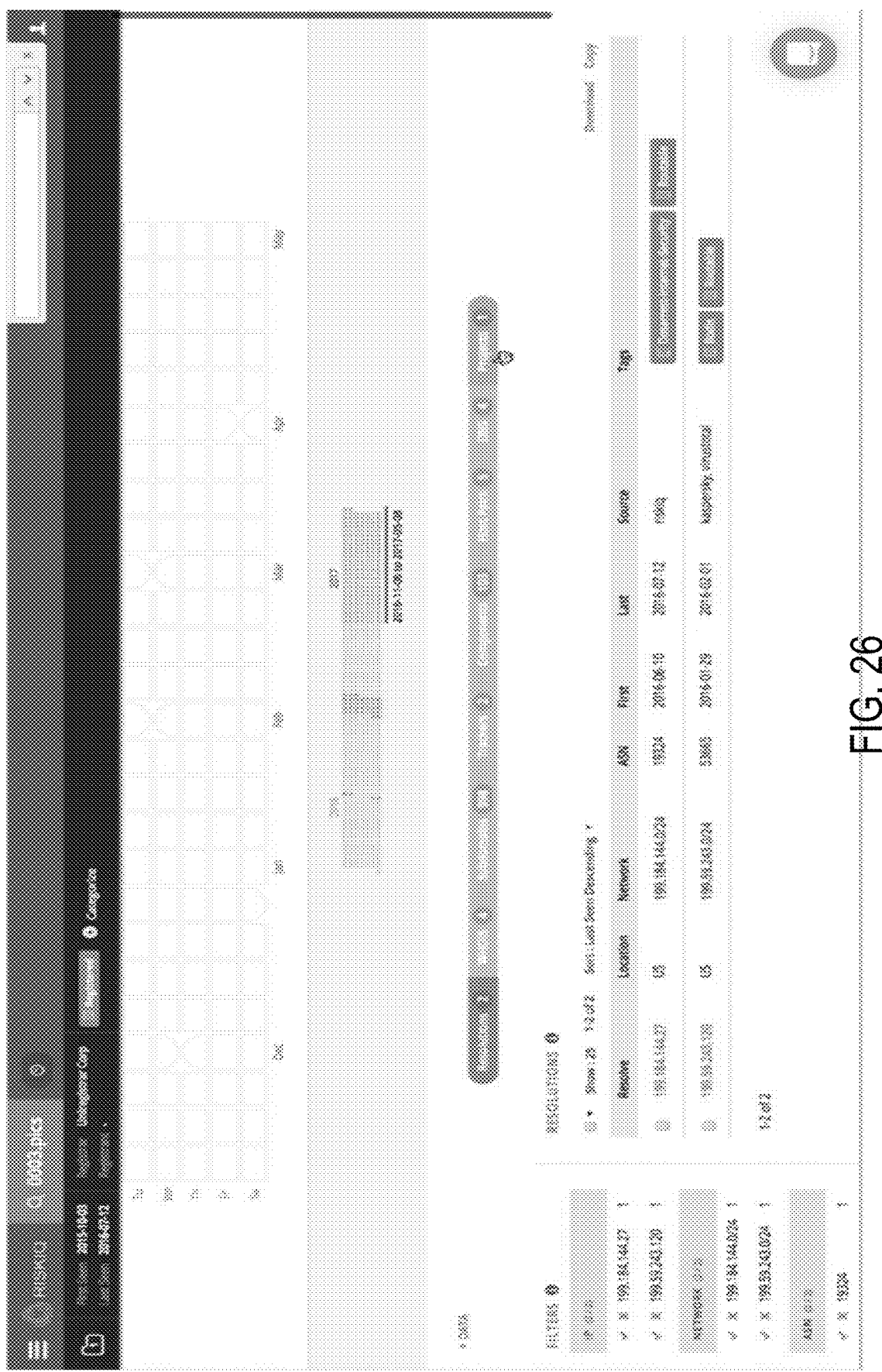
Figure 27:
Figure 28:
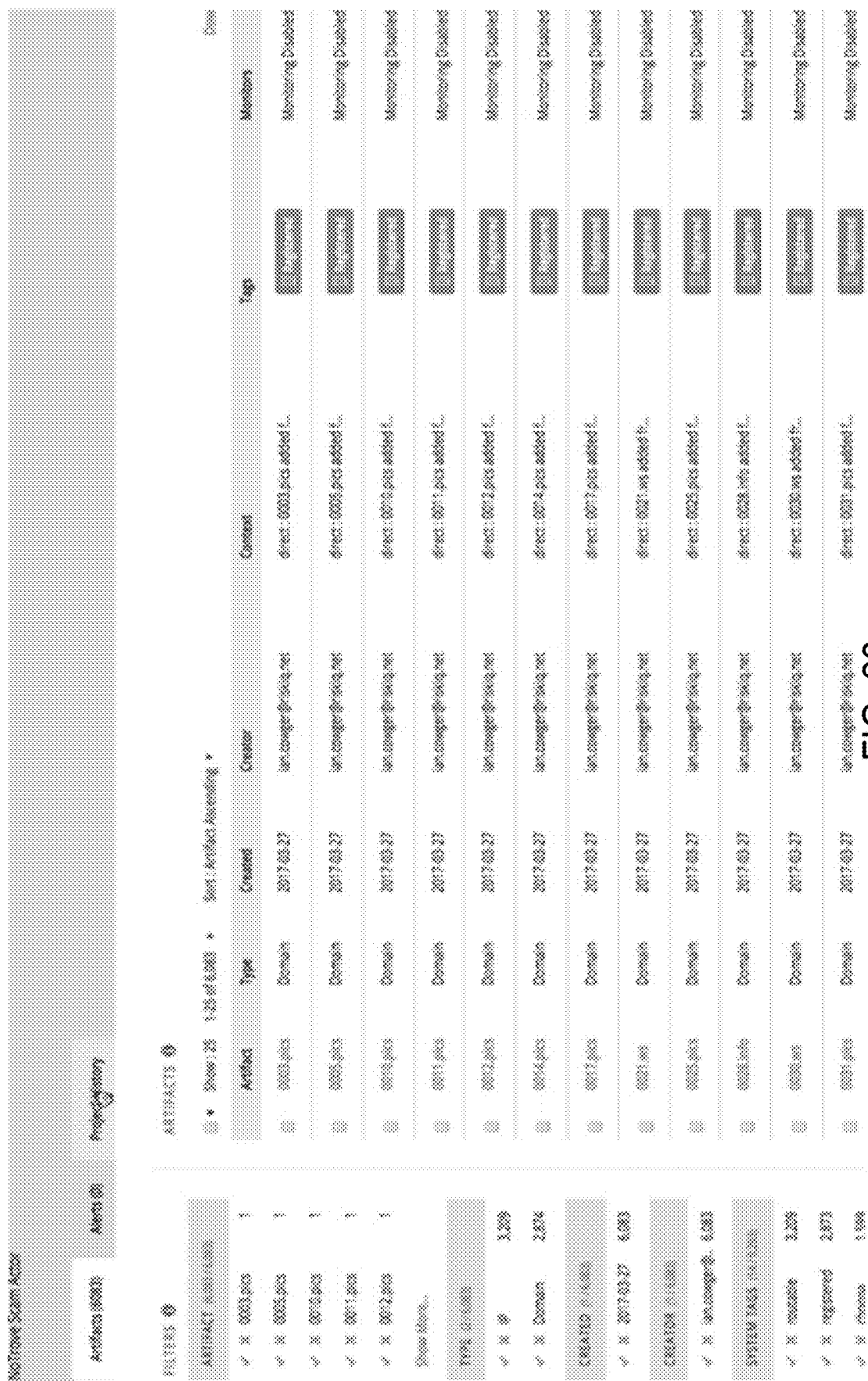

FIG. 26 illustrates a view of the network activity displayed for an asset which is selected in a project shown in the graphical interface of FIG. 25. The network activity is shown in a data record interface and the underlying network data is visualized in a heat map interface. FIG. 27 further illustrates an example of network data shown for the asset selected in the project shown in FIG. 25. In this example, the data record interface shows network components that are used to implement the network assets (e.g., hostnames) for the underlying network data corresponding to the artifact selected in FIG. 25. Switching back to the graphical interface of FIG. 25, also shown in FIG. 28, a user may interact with the "projects history" element to view how artifacts were added to the project.

Figure 29:
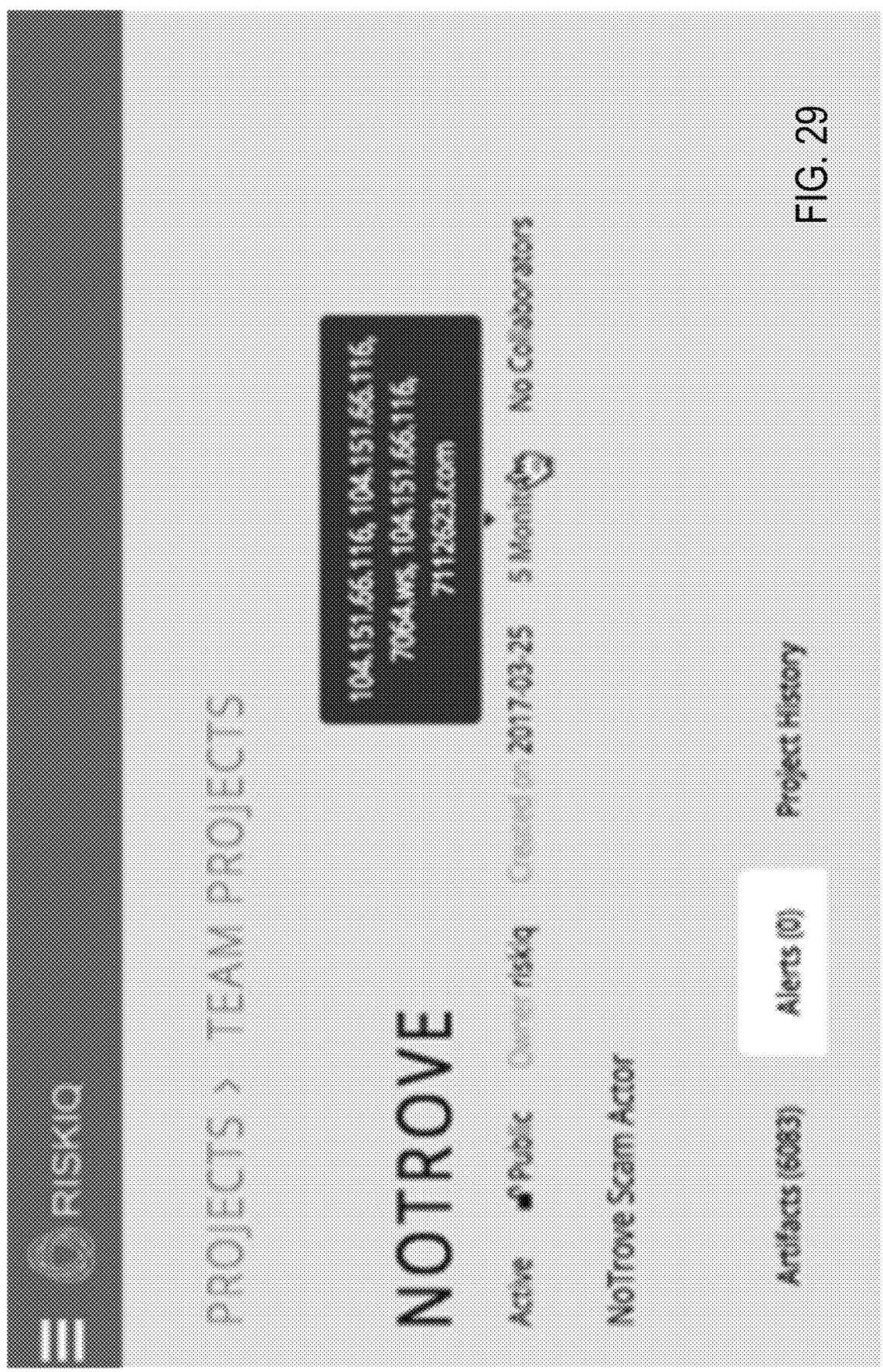

In FIG. 29, a graphical interface is shown for viewing the monitors that are configured for a project. The monitors may be shown according to a configuration of each monitor. For example, a monitor may be shown as the artifact which is being monitored.

IV. Computer Systems for a Network Analysis System and Client System(s)

Figure 30:
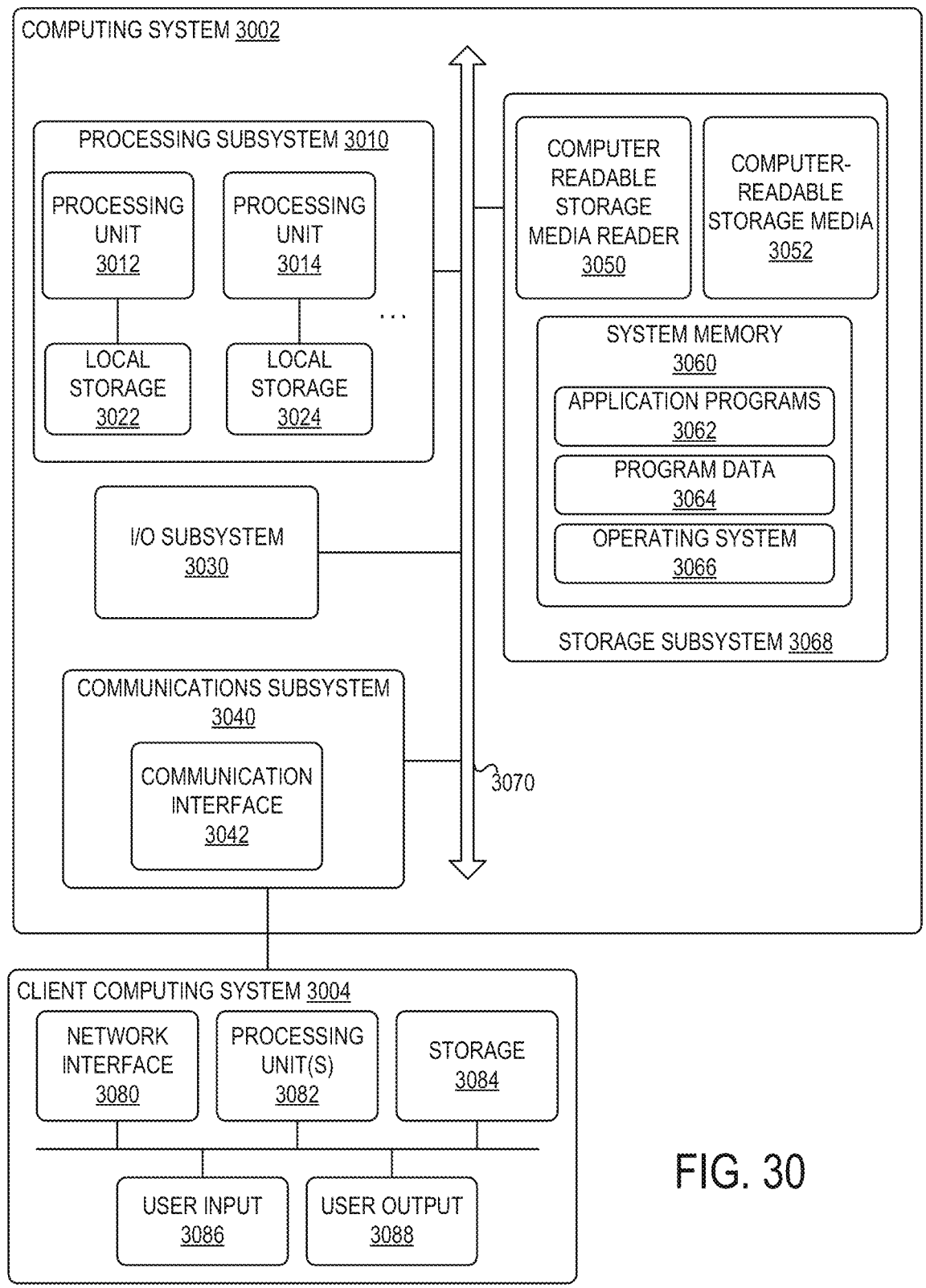
FIG. 30 shows a simplified block diagram of a computing system and a client computing system usable to implement some embodiments.

Various operations described herein may be implemented on computer systems, which may be of generally conventional design. FIG. 30 shows a simplified block diagram of a representative computing system 3002 and client computing system 3004 usable to implement certain embodiments of the present disclosure. In various embodiments, computing system 3002 or similar systems may implement Network analysis system 120, or any other computing system described herein or portions thereof. Client computing system 3004 or similar systems may implement client system 104, or other client systems described herein.

Computing system 3002 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 3002 may include processing subsystem 3010. Processing subsystem 3010 may communicate with a number of peripheral systems via bus subsystem 3070. These peripheral systems may include I/O subsystem 3030, storage subsystem 3068, and communications subsystem 3040.

Bus subsystem 3070 provides a mechanism for letting the various components and subsystems of server computing system 3004 communicate with each other as intended. Although bus subsystem 3070 is shown schematically as a single bus, alternative embodiments of the bus subsystem may utilize multiple buses. Bus subsystem 3070 may form a local area network that supports communication in processing subsystem 3010 and other components of server computing system 3020. Bus subsystem 3070 may be implemented using various technologies including server racks, hubs, routers, etc. Bus subsystem 3070 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 3030 may include devices and mechanisms for inputting information to computing system 3002 and/or for outputting information from or via computing system 3002. In general, use of the term "input device" is intended to include all possible types of devices and mechanisms for inputting information to computing system 3002. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 3002 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 3010 controls the operation of computing system 3002 and may comprise one or more processing units 3012, 3014, etc. A processing unit may include one or more processors, including single core processor or multicore processors, one or more cores of processors, or combinations thereof. In some embodiments, processing subsystem 3010 may include one or more special purpose co-processors such as graphics processors, digital signal processors (DSPs), or the like. In some embodiments, some or all of the processing units of processing subsystem 3010 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 3022, 3024. Any type of processors in any combination may be included in processing unit(s) 3012, 3014.

In some embodiments, processing subsystem 3010 may be implemented in a modular design that incorporates any number of modules (e.g., blades in a blade server implementation). Each module may include processing unit(s) and local storage. For example, processing subsystem 3010 may include processing unit 3012 and corresponding local storage 3022, and processing unit 3014 and corresponding local storage 3024.

Local storage 3022, 3024 may include volatile storage media (e.g., conventional DRAM, SRAM, SDRAM, or the like) and/or non-volatile storage media (e.g., magnetic or optical disk, flash memory, or the like). Storage media incorporated in local storage 3022, 3024 may be fixed, removable or upgradeable as desired. Local storage 3022, 3024 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 3012, 3014 need at runtime. The ROM may store static data and instructions that are needed by processing unit(s) 3012, 3014. The permanent storage device may be a non-volatile read-and-write memory device that may store instructions and data even when a module including one or more processing units 3012, 3014 and local storage 3022, 3024 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 3022, 3024 may store one or more software programs to be executed by processing unit(s) 3012, 3014, such as an operating system and/or programs implementing various server functions such as functions of Network analysis system 120, or any other server(s) associated with Network analysis system 120. "Software" refers generally to sequences of instructions that, when executed by processing unit(s) 3012, 3014 cause computing system 3002 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 3012, 3014. In some embodiments the instructions may be stored by storage subsystem 3068 (e.g., computer readable storage media). In various embodiments, the processing units may execute a variety of programs or code instructions and may maintain multiple concurrently executing programs or processes. At any given time, some or all of the program code to be executed may be resident in local storage 3022, 3024 and/or in storage subsystem including potentially on one or more storage devices. Software may be implemented as a single program or a collection of separate programs or program modules that interact as desired. From local storage 3022, 3024 (or non-local storage described below), processing unit(s) 3012, 3014 may retrieve program instructions to execute and data to process in order to execute various operations described above.

Storage subsystem 3068 provides a repository or data store for storing information that is used by computing system 3002. Storage subsystem 3068 provides a tangible non-transitory computer-readable storage medium for storing the basic programming and data constructs that provide the functionality of some embodiments. Software (programs, code modules, instructions) that when executed by processing subsystem 3010 provide the functionality described above may be stored in storage subsystem 3068. The software may be executed by one or more processing units of processing subsystem 3010. Storage subsystem 3068 may also provide a repository for storing data used in accordance with the present disclosure.

Storage subsystem 3068 may include one or more non-transitory memory devices, including volatile and non-volatile memory devices. As shown in FIG. 30, storage subsystem 3068 includes a system memory 3060 and a computer-readable storage media 3052. System memory 3060 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 3002, such as during start-up, may typically be stored in the ROM. The RAM typically contains data and/or program modules that are presently being operated and executed by processing subsystem 3010. In some implementations, system memory 3060 may include multiple different types of memory, such as static random access memory (SRAM) or dynamic random access memory (DRAM). Storage subsystem 3068 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 3068.

By way of example, and not limitation, as depicted in FIG. 30, system memory 3060 may store application programs 3062, which may include client applications, Web browsers, mid-tier applications, relational database management systems (RDBMS), etc., program data 3064, and one or more operating systems 3066. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 3052 may store programming and data constructs that provide the functionality of some embodiments. Software (programs, code modules, instructions) that when executed by processing subsystem 3010 a processor provide the functionality described above may be stored in storage subsystem 3068. By way of example, computer-readable storage media 3052 may include non-volatile memory such as a hard disk drive, a magnetic disk drive, an optical disk drive such as a CD ROM, DVD, a Blu-Ray® disk, or other optical media. Computer-readable storage media 3052 may include, but is not limited to, Zip® drives, flash memory cards, universal serial bus (USB) flash drives, secure digital (SD) cards, DVD disks, digital video tape, and the like. Computer-readable storage media 3052 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 3052 may provide storage of computer-readable instructions, data structures, program modules, and other data for computing system 3002.

In certain embodiments, storage subsystem 3068 may also include a computer-readable storage media reader 3050 that may further be connected to computer-readable storage media 3052. Together and, optionally, in combination with system memory 3060, computer-readable storage media 3052 may comprehensively represent remote, local, fixed, and/or removable storage devices plus storage media for storing computer-readable information.

In certain embodiments, computing system 3002 may provide support for executing one or more virtual machines. Computing system 3002 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 3002. Accordingly, multiple operating systems may potentially be run concurrently by computing system 3002. Each virtual machine generally runs independently of the other virtual machines.

Communication subsystem 3040 provides an interface to other computer systems and networks. Communication subsystem 3040 serves as an interface for receiving data from and transmitting data to other systems from computing system 3002. For example, communication subsystem 3040 may enable computing system 3002 to establish a communication channel to one or more client computing devices via the Internet for receiving and sending information from and to the client computing devices.

Communication subsystem 3040 may support both wired and/or wireless communication protocols. For example, in certain embodiments, communication subsystem 3040 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 3040 may provide wired network connectivity (e.g., Ethernet) in addition to or instead of a wireless interface.

Communication subsystem 3040 may receive and transmit data in various forms. For example, in some embodiments, communication subsystem 3040 may receive input communication in the form of structured and/or unstructured data feeds, event streams, event updates, and the like. For example, communication subsystem 3040 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 3040 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 3040 may also be configured to output the structured and/or unstructured data feeds, event streams, event updates, and the like to one or more databases that may be in communication with one or more streaming data source computers coupled to computing system 3002.

Communication subsystem 3040 may provide a communication interface 3042, e.g., a WAN interface, which may provide data communication capability between the local area network (bus subsystem 3070) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 3002 may operate in response to requests received via communication interface 3042. Further, in some embodiments, communication interface 3042 may connect computing systems 3002 to each other, providing scalable systems capable of managing high volumes of activity. Conventional or other techniques for managing server systems and server farms (collections of server systems that cooperate) may be used, including dynamic resource allocation and reallocation.

Computing system 3002 may interact with various user-owned or user-operated devices via a wide-area network such as the Internet. An example of a user-operated device is shown in FIG. 30 as client computing system 3002. Client computing system 3004 may be implemented, for example, as a consumer device such as a smart phone, other mobile phone, tablet computer, wearable computing device (e.g., smart watch, eyeglasses), desktop computer, laptop computer, and so on.

For example, client computing system 3004 may communicate with computing system 3002 via communication interface 3042. Client computing system 3004 may include conventional computer components such as processing unit(s) 3082, storage device 3084, network interface 3080, user input device 3086, and user output device 3088. Client computing system 3004 may be a computing device implemented in a variety of form factors, such as a desktop computer, laptop computer, tablet computer, smart phone, other mobile computing device, wearable computing device, or the like.

Processing unit(s) 3082 and storage device 3084 may be similar to processing unit(s) 3012, 3014 and local storage 3022, 3024 described above. Suitable devices may be selected based on the demands to be placed on client computing system 3004; for example, client computing system 3004 may be implemented as a "thin" client with limited processing capability or as a high-powered computing device. Client computing system 3004 may be provisioned with program code executable by processing unit(s) 3082 to enable various interactions with computing system 3002 of a message management service such as accessing messages, performing actions on messages, and other interactions described above. Some client computing systems 3004 may also interact with a messaging service independently of the message management service.

Network interface 3080 may provide a connection to a wide area network (e.g., the Internet) to which communication interface 3040 of computing system 3002 is also connected. In various embodiments, network interface 3080 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 3086 may include any device (or devices) via which a user may provide signals to client computing system 3004; client computing system 3004 may interpret the signals as indicative of particular user requests or information. In various embodiments, user input device 3086 may include any or all of a keyboard, touch pad, touch screen, mouse or other pointing device, scroll wheel, click wheel, dial, button, switch, keypad, microphone, and so on.

User output device 3088 may include any device via which client computing system 3004 may provide information to a user. For example, user output device 3088 may include a display to display images generated by or delivered to client computing system 3004. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 3088 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 3012, 3014 and 3082 may provide various functionality for computing system 3002 and client computing system 3004, including any of the functionality described herein as being performed by a server or client, or other functionality associated with message management services.

It will be appreciated that computing system 3002 and client computing system 3004 are illustrative and that variations and modifications are possible. Computer systems used in connection with embodiments of the present disclosure may have other capabilities not specifically described here. Further, while computing system 3002 and client computing system 3004 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the present disclosure has been described with respect to specific embodiments, one skilled in the art will recognize that numerous modifications are possible. For instance, although specific processes are described with reference to FIGS. 2 and 3, other processes may be implemented. Embodiments of the present disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the present disclosure has been described with respect to specific embodiments, it will be appreciated that the present disclosure is intended to cover all modifications and equivalents within the scope of the following claims.

What is claimed is:

1. A method comprising:
    accessing network data about one or more assets from one or more data sources by a network analysis system from one or more data sources;
    generating, at the network analysis system, a plurality of data sets associated with the one or more assets based on the network data and user-generated data created by a plurality of users of the network analysis system;
    generating a graphical interface to display information to a first viewing user of the plurality of users about the one or more assets based on the plurality of data sets and the user-generated data;
    receiving a request from the first viewing user to configure a first project associated with at least one selected asset of the one or more assets, the first project comprising a logical container of the at least one selected asset of the one or more assets;
    retrieving configured monitoring data associated with the at least one selected asset based on user-generated data associated with the at least one selected asset, wherein the user-generated data associated with the at least one selected asset configures the monitoring data and wherein the configured monitoring data comprises change information about the at least one selected asset;
    generating data representing the first project associated with the at least one selected asset, the data representing the first project including the configured monitoring data;
    causing the graphical interface to display the data representing the first project in association with the at least one selected asset;
    identifying one or more assets in a second project created by a second viewing user of the plurality of users, the one or more identified assets related to the selected asset in the first project based on a shared attribute; and
    updating the graphical interface to display a representation of the one or more identified assets in the second project in association with the first project based on the shared attribute.

2. The method of claim 1, wherein the retrieved data associated with the one or more identified assets in the second project includes historical data indicating how the one or more identified assets were discovered.

3. The method of claim 1, wherein the retrieved data associated with the one or more identified assets in the second project includes aggregated data of other assets having the shared attribute.

4. The method of claim 1, wherein the first project is associated with public network data of a potential threat actor.

5. The method of claim 1, further comprising:
    receiving a request to configure monitoring of the at least one selected asset;
    detecting an event related to the monitoring of the at least one selected asset;
    generating data associated with the detected event; and
    updating the graphical interface to display the detected event and the data associated with the detected event.

6. The method of claim 5, wherein the request to configure monitoring is received by a toggling action performed on an interactive element in the graphical interface, wherein the graphical interface includes the interactive element to configure the monitoring.

7. The method of claim 1, wherein the second project is associated with public network data of a potential threat actor.

8. A system comprising:
    a network analysis component, implemented at least partially by hardware, configured to:
        access network data about one or more assets from one or more data sources by a network analysis system from one or more data sources;
        generate, at the network analysis system, a plurality of data sets associated with the one or more assets based on the network data and user-generated data created by a plurality of users of the network analysis system;
        generate a graphical interface to display information to a first viewing user of the plurality of users about the one or more assets based on the plurality of data sets and the user-generated data;
        receive a request from the first viewing user to configure a first project associated with at least one selected asset of the one or more assets, the first project comprising a logical container of the at least one selected asset of the one or more assets;
        retrieve configured monitoring data associated with the at least one selected asset based on user-generated data associated with the at least one selected asset, wherein the user-generated data associated with the at least one selected asset configures the monitoring data and wherein the configured monitoring data comprises change information about the at least one selected asset;
        generate data representing the first project associated with the at least one selected asset, the data representing the first project including the configured monitoring data; and
        cause the graphical interface to display the data representing the first project in association with the at least one selected asset; and
    a project manager component, implemented at least partially by hardware, configured to:
        identify one or more assets in a second project created by a second viewing user of the plurality of users, the one or more identified assets related to the selected asset in the first project based on a shared attribute; and update the graphical interface to display a representation of the one or more identified assets in the second project in association with the first project based on the shared attribute.

9. The system of claim 8, wherein the retrieved data associated with the one or more identified assets in the second project includes historical data indicating how the one or more identified assets were discovered.

10. The system of claim 8, wherein the retrieved data associated with the one or more identified assets in the second project includes aggregated data of other assets having the shared attribute.

11. The system of claim 8, wherein the first project is associated with public network data of a potential threat actor.

12. The system of claim 8, further comprising:
a monitor manager component, implemented at least partially by hardware, configured to:
receive a request to configure monitoring of the at least one selected asset;
detect an event related to the monitoring of the at least one selected asset;
generate data associated with the detected event; and
update the graphical interface to display the detected event and the data associated with the detected event.

13. The system of claim 12, wherein the request to configure monitoring is received by a toggling action performed on an interactive element in the graphical interface, wherein the graphical interface includes the interactive element to configure the monitoring.

14. The system of claim 8, wherein the second project is associated with public network data of a potential threat actor.

15. One or more non-transitory computer-readable media storing instructions that, when executed by one or more computing devices, cause:
accessing network data about one or more assets from one or more data sources by a network analysis system from one or more data sources;
generating, at the network analysis system, a plurality of data sets associated with the one or more assets based on the network data and user-generated data created by a plurality of users of the network analysis system;
generating a graphical interface to display information to a first viewing user of the plurality of users about the one or more assets based on the plurality of data sets and the user-generated data;
receiving a request from the first viewing user to configure a first project associated with at least one selected asset of the one or more assets, the first project comprising a logical container of the at least one selected asset of the one or more assets;
retrieving configured monitoring data associated with the at least one selected asset based on user-generated data associated with the at least one selected asset, wherein the user-generated data associated with the at least one selected asset configures the monitoring data and wherein the configured monitoring data comprises change information about the at least one selected asset;
generating data representing the first project associated with the at least one selected asset, the data representing the first project including the configured monitoring data;
causing the graphical interface to display the data representing the first project in association with the at least one selected asset; and
identifying one or more assets in a second project created by a second viewing user of the plurality of users, the one or more identified assets determined to be related to the selected asset in the first project based on a shared attribute; and
updating the graphical interface to display a representation of the one or more identified assets in the second project in association with the first project based on the shared attribute.

16. The one or more non-transitory computer-readable media of claim 15, wherein the retrieved data associated with the one or more identified assets in the second project includes historical data indicating how the one or more identified assets were discovered.

17. The one or more non-transitory computer-readable media of claim 15, wherein the retrieved data associated with the one or more identified assets in the second project includes aggregated data of other assets having the shared attribute.

18. The one or more non-transitory computer-readable media of claim 15, wherein the first project is associated with public network data of a potential threat actor.

19. The one or more non-transitory computer-readable media of claim 15, further comprising instructions that, when executed by the one or more computing devices, cause:
receiving a request to configure monitoring of the at least one selected asset;
detecting an event related to the monitoring of the at least one selected asset;
generating data associated with the detected event; and
updating the graphical interface to display the detected event and the data associated with the detected event.

20. The one or more non-transitory computer-readable media of claim 19, wherein the request to configure monitoring is received by a toggling action performed on an interactive element in the graphical interface, wherein the graphical interface includes the interactive element to configure the monitoring.

21. The one or more non-transitory computer-readable media of claim 15, wherein the second project is associated with public network data of a potential threat actor.

* * * * *